| (12) | United States Patent | (10) Patent No.: US 10,280,772 B2 |
|---|---|---|
| | AlJwesm | (45) Date of Patent: May 7, 2019 |

(54) FLOW DISTRIBUTION DEVICE AND METHOD

(71) Applicant: Saudi Arabian Oil Company, Dhahran (SA)

(72) Inventor: Farooq Nasser AlJwesm, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 80 days.

(21) Appl. No.: 15/065,239

(22) Filed: Mar. 9, 2016

(65) Prior Publication Data

US 2016/0369640 A1 Dec. 22, 2016

Related U.S. Application Data

(60) Provisional application No. 62/182,771, filed on Jun. 22, 2015.

(51) Int. Cl.
*F22B 37/40* (2006.01)
*F01D 9/02* (2006.01)
(Continued)

(52) U.S. Cl.
CPC ............... *F01D 9/02* (2013.01); *F01D 25/30* (2013.01); *F22B 1/1815* (2013.01); *F22B 37/40* (2013.01); *F01K 23/10* (2013.01); *F05D 2220/32* (2013.01); *F05D 2220/72* (2013.01); *F05D 2240/12* (2013.01); *F05D 2300/10* (2013.01); *F05D 2300/603* (2013.01); *F22B 37/04* (2013.01); *Y02E 20/16* (2013.01)

(58) Field of Classification Search
CPC .... F05D 2240/12; F22B 1/1815; F22B 37/40; F23J 13/00; F01D 25/30; F24F 13/081
See application file for complete search history.

(56) References Cited

U.S. PATENT DOCUMENTS 4,573,551 A 3/1986 Schwerdtner
5,431,009 A * 7/1995 Bauver, II ............... F01D 25/20
122/7 R
(Continued)

FOREIGN PATENT DOCUMENTS

| DE | 19737507 | 3/1999 |
|---|---|---|
| EP | 08-63364 | 9/1998 |
| JP | 63117125 | 5/1988 |

OTHER PUBLICATIONS

Victor Corsiglia, Lawrence Olson, and Michael Falarksi, "Aerodynamic characteristics of the 40- by 80/80- by 120-Foot Wind Tunnel at NASA Ames Research Center", NASA TM 85946, Apr. 1984, NASA.*

(Continued)

*Primary Examiner* — Jonathan R Matthias
(74) *Attorney, Agent, or Firm* — Fish & Richardson P.C.

(57) ABSTRACT

Systems and methods provide a flow distribution device that includes a duct for a heat recovery steam generators having a duct an expansion portion extending from an inlet portion. The expansion portion has a larger cross-sectional area than the inlet portion. The flow distribution device includes a guide vane having a curved surface. The guide vane is positioned in the duct to extend from at least a part of the inlet portion into the expansion portion.

17 Claims, 20 Drawing Sheets

(51) Int. Cl.
  F01D 25/30    (2006.01)
  F22B 1/18     (2006.01)
  F01K 23/10    (2006.01)
  F22B 37/04    (2006.01)

(56) References Cited

U.S. PATENT DOCUMENTS

| | | | | |
|---|---|---|---|---|
| 8,146,341 B2* | 4/2012 | Siden | ............... | F01D 25/30 122/7 R |
| 2002/0150471 A1* | 10/2002 | Liu | ............... | F01D 5/141 415/116 |
| 2003/0192737 A1* | 10/2003 | Han | ............... | F01D 25/30 181/224 |
| 2004/0238271 A1* | 12/2004 | Han | ............... | F04D 29/545 181/224 |
| 2004/0255592 A1* | 12/2004 | Braun | ............... | F01D 25/30 60/772 |
| 2007/0044475 A1* | 3/2007 | Leser | ............... | F22B 1/1815 60/772 |
| 2007/0272483 A1* | 11/2007 | Morin | ............... | F02C 7/045 181/292 |
| 2013/0265848 A1* | 10/2013 | Wurz | ............... | F04D 29/541 366/337 |

OTHER PUBLICATIONS

Mark Beale, "Turning vanes in exhaust duct flow", Sep. 2014, Naval Postgraduate School.*
International Search Report and Written Opinion of the International Searching Authority issued in International Application No. PCT/US2016/029981 dated Sep. 6, 2016; 12 pages.
Alfonsi, "On Direct Numerical Simulation of Turbulent Flows," Applied Mechanics Reviews, vol. 64, No. 2, Mar. 2011; 33 pages.
Al-Hobo et al., "Design of Dual Pressure Heat Recovery Steam Generator for Combined Power Plants," Scientific Corporation vol. 1 No. 1, 2013; 10 pages, <http://conf-scoop.org/IEPEM-2013/11_Maher_IEPEM.pdf>.
Ameri et al., "The CFD Modeling of Heat Recovery Steam Generator Inlet Duct," International Journal of Energy Engineering (IJEE) vol. 3, No. 3, Jun. 2013; pp. 74-79.
Bagnasco et al., "Management and Dynamic Performances of Combined Cycle Power Plants During Parallel and Islanding Operation," IEEE Transactions on Energy Conversion, vol. 13, No. 2, Jun. 1998; pp. 194-201.
Baukal, "Industrial Burners Handbook," CRC Press, 2004; 7 pages.
Blazek, "Computational Fluid Dynamics: Principles and Applications," 2001, Elsevier Science Ltd.; 8 pages.
Buecker, "Basics of Boiler and HRSG Design," PennWell Books, 2002; 10 pages.
CFD-Online, "Direct numerical simulation (DNS)," Jul. 2012; 3 pages, <http://www.cfd-online.com/Wiki/Direct_numerical_simulation_(DNS)>.
Craft et al., "Progress in the generalization of wall-function treatments," International Journal of Heat and Fluid Flow, vol. 23, No. 2, Apr. 2002; pp. 148-160.
Daiber, "Fluid dynamics of the HRSG gas side," Vogt Power International Inc., Mar. 15, 2006; 12 pages, <http://www.powermag.com/fluid-dynamics-of-the-hrsg-gas-side/>.
Daman, "The World's First Industrial Gas Turbine Set," The American Society of Mechanical Engineers, Sep. 2, 1988; 8 pages, <https://www.asme.org/wwwasmeorg/media/ResourceFiles/AboutASME/Who%20We%20Are/Engineering%20History/Landmarks/135-Neuchatel-Gas-Turbine.pdf>.
Ganapathy, "Heat-Recovery Steam Generators: Understand the Basics," Chemical Engineering Progress, Aug. 1996; 14 pages, <http://www.angelfire.com/md3/vganapathy/hrsgcep.pdf>.
Ganapathy, "Optimize Energy Efficiency of HRSG," Hydrocarbon Processing, Dec. 2001; 5 pages.
Ganapathy, "Industrial Boilers and Heat Recovery Steam Generators: Design, Applications, and Calculations," Marcel Dekker, Inc, 2003; 618 pages, <http://www.steamshed.com/pdf/016IndustrialBoilersAndHeatRecovery.pdf>.
Giuliano et al., "Reacting Flows in Post-Combustion Burners of a Heat Recovery Steam Generator," Netherlands, 5th European Thermal-Sciences Conference, 2008; 7 pages, <http://repository.tue.nl/634890> Password required for: <http://www.eurotherm2008.tue.nl/Proceedings_Eurotherm2008/papers/Combustion/COM_9.pdf>.
Haase, Aupoix, et al., eds. "Flomania—A European Initiative on Flow Physics Modelling: Results of the European-Union funded project, 2002-2004," vol. 94, Springer Science & Business Media, 2006; Section 3, "Non Linear Eddy Viscosity Models and Explicit Algebraic Reynolds Stress Models," pp. 142-153.
Hanjalic, "Contribution towards a Reynolds-Stress Closure for Low-Reynolds-Number Turbulence," Journal of Fluid Mechanics, vol. 74, No. 4, Feb. 12, 1975; pp. 593-610, <https://www.researchgate.net/profile/Kemal_Hanjalic/publication/231888564_A_Reynolds_stress_model_of_turbulence_and_its_application_to_thin_shear_flows/links/0fcfd50fad8664e175000000.pdf>.
Hegde, N., I. Han, et al. (2007). "Flow and Heat Transfer in Heat Recovery Steam Generators." Journal of Energy Resources Technology 129(3): 232-242.
Hunt, "The History of the Industrial Gas Turbine," Institution of Diesel and Gas Turbine Engineers, vol. 2, No. 582, 2011; 50 pages, <http://www.idgte.org/IDGTE%20Paper%20582%20History%20of%20The%20Industrial%20Gas%20Turbine%20Part%201%20v2%20(revised%2012-Jan-11).pdf>.
Issakhov, "Numerical Methods for Solving Turbulent Flows by Using Parallel Technologies," Journal of Computer and Communications, vol. 1, No. 1, 2013; 5 pages, <http://file.scirp.org/pdf/JCC_20130206132644.pdf>.
Kalitzin et al., "Near-wall behavior of RANS turbulence models and implications for wall functions," Journal of Computational Physics, vol. 204, No. 1, 2005; pp. 265-291, <http://citeseerx.ist.psu.edu/viewdoc/download?doi=10.1.1.584.2507&rep=rep1&type=pdf>.
Kiameh, "Power Generation Handbook—Selection, Applications, Operation, and Maintenance," The McGraw-Hill Companies, Inc., 2002; 11 pages.
Kolev, "Large eddy simulation. Multiphase Flow Dynamics 4—Turbulence, Gas Adsorption and Release, Diesel Fuel Properties," Springer Berlin Heidelberg, Section 10: Large Eddy Simulation, 2012; pp. 195-207.
Launder et al., "The numerical computation of turbulent flows," Computer Methods in Applied Mechanics and Engineering, vol. 3, No. 2, 1974; pp. 269-289.
Lee et al., "On the Effect of Swirl Flow of Gas Turbine Exhaust Gas in an Inlet Duct of Heat Recovery Steam Generator," Journal of Engineering for Gas Turbines and Power, Transactions of the ASME, vol. 124, No. 3, Jul. 2002; pp. 496-502.
Moin, "Direct numerical simulation: A tool in turbulence research," Annual Review of Fluid Mechanics, vol. 30, 1998; pp. 539-578.
Param et al., "Hydrodynamic Analysis of Flue Gas Flow Behavior Within a Heat Recovery Steam Generator," MapnaBoiler Co, 2010; 11 pages, <https://s3.amazonaws.com/academia.edu.documents/9592830/38.pdf?AWSAccessKeyId=AKIAIWOWYYGZ2Y53UL3A&Expires=1507746296&Signature=3h8YKwVVU%2BBsiNYAUQt01mRBw%2BA%3D&response-content-disposition=inline%3B%20filename%3DHYDRODYNAMIC_ANALYSIS_OF_FLUE_GAS_FLOW_B.pdf>.
Pinelli, "Numerical based design of exhaust gas system in a cogeneration power plant," Applied Energy, vol. 86, No. 6, 2009; pp. 857-866.
Pope et al., "Turbulent Flows," Cambridge University Press, 2000; 10 pages.
Rahimi et al., "CFD modeling of a boiler's tubes rupture," Applied Thermal Engineering, vol. 26, 2006; pp. 2192-2200.
Shi et al., "Application of CFD Modeling in HRSG Evase Design," Proceedings of the ASME 2009 Power Conference, Jul. 2009; 8 pages, <http://www.power-eng.com/content/pe/en/whitepapers/2012/cmi0.whitepaperpdfrender.pdf>.

(56) References Cited

OTHER PUBLICATIONS

Shin et al., "Investigation of the Flow Pattern in a Complex Inlet Duct of a Heat Recovery Steam Generator," Energy and Power, vol. 2, No. 1, 2012; pp. 1-8, <http://article.sapub.org/10.5923.j.ep.20120201.01.html>.
Tu et al., "Computational Fluid Dynamics A Practical Approach," Butterworth Heinemann, 2012; 5 pages.
Versteeg, "An Introduction to Computational Fluid Dynamics," Pearson Education, 2007; 9 pages.
Vytla, "CFD Modeling of Heat Recovery Steam Generator and its Components Using Fluent" Mechanical Engineering Department, University of Kentucky, 2005; 185 pages, <http://uknowledge.uky.edu/cgi/viewcontent.cgi?article=1339&context=gradschool_theses>.
Walter et al., "Fluid flow in channels between two gas turbines and heat recovery steam generator—a theoretical investigation," WSEAS Transactions on Fluid Mechanics, vol. 6, No. 4, 2011; pp. 257-269, <http://www.wseas.us/e-library/transactions/fluid/2011/54-085.pdf>.
Ward-Smith, "Internal Fluid Flow—The Fluid Dynamics of Flow in Pipes and Ducts," Oxford: Clarendon Press, 1980; 11 pages.
Wilcox, "Turbulence Modeling for CFD," DCW Industries, Inc., 1993; 7 pages.
Yang et al., "Vortex shedding in flow past an inclined flat plate at high incidence," Physics of Fluids, vol. 24, No. 8, 2012; 6 pages, <http://www.tsfp-conference.org/proceedings/2011/p52p.pdf>.
Zhao et al., "Modeling and Cost Optimization of Combined Cycle Heat Recovery Generator Systems," ASME Turbo Expo (GT2003-38568), Jun. 2003; 11 pages, <https://smartech.gatech.edu/bitstream/handle/1853/6362/ASME-GT-2003-38568.pdf>.

\* cited by examiner

FLOW DISTRIBUTION DEVICE AND METHOD

CROSS REFERENCE TO RELATED APPLICATION

The present application claims priority to U.S. Provisional Application No. 62/182,771, filed Jun. 22, 2015, entitled "FLOW DISTRIBUTION DEVICE AND METHOD," which application is hereby incorporated herein by reference in its entirety.

TECHNICAL FIELD

The present disclosure relates to heat recovery steam generation devices and particularly to flow distribution devices for components of a heat recovery steam generation device.

BACKGROUND

Combined cycle power plants are plants that produce electrical power via generators driven by gas and steam turbines. The gas turbine is connected to an electrical generator to produce electrical power. Also, high grade heat in the flue gas from the gas turbine exhaust can be directed to a heat recovery steam generator (HRSG) to generate steam. This steam is used as a driver for a steam turbine that is connected to another generator to produce additional electrical power as shown in FIG. 1. The combined cycle includes two cycles working together in most cases. The gas turbine can use a Brayton cycle, and a Rankine cycle can be used for steam generation. HRSG is a major part of the combined cycle that heavily contributes to the cycle efficiency.

A HRSG 100 is used to convert waste heat energy from gas turbine exhaust 101 exhausted from gas turbine 104. The gas turbine exhaust is used to superheat steam that is used to drive steam turbines, namely high pressure steam turbine 102a and low pressure steam turbine 102b for the purpose of power generation. The HRSG 100 has three main sets of tube banks; economizers 104a, 104b, evaporators 105a, 105b and super heaters 106a, 106b that are heated via the gas turbine exhaust 101. The function of the economizers 104a, 104b is to raise water temperature to its saturation point, while evaporators 105a, 105b produce saturated steam. Superheated steam generated in the superheaters 106a, 106b will then operate the steam turbines 102a and 102b respectively. The tube banks can be found in single or multiple pressure stages. The HRSG 100 is treated as a boiler in terms of material selection and design.

There are two methods for circulating the steam inside the HRSG 100. FIG. 2a shows a method for naturally circulating steam inside of the HRSG 100. Natural circulation of the water vapor mixture is normally used for horizontal gas flow HRSGs. However, due to footprint limitations, induced flow circulation via additional pumps may be used in a vertical gas flow arrangement as shown in FIG. 2b to circulate the water-steam mixture through horizontal tubes.

HRSGs used in combined cycle plants typically operate and rely on the gas turbine exhaust rather than using auxiliary firing. However, in cogeneration plants, a complementary furnace or auxiliary firing system may be implemented to further increase the steam generation.

HRSGs use a flue gas from turbine exhaust to produce superheated steam to operate a steam turbine in combined cycle power plants. This flue gas passes through a duct, such as duct 100 before it impinges on the super heater tube banks. The exhaust from a gas turbine is extremely turbulent having a high temperature and speed. The exhaust gas from an exhaust gas turbine traverses the duct 300 having a duct inlet portion 301 that expands at the duct expansion portion 302 as shown in FIG. 3. As the exhaust gas passes from the duct inlet portion 301 to the duct expansion portion 302 the sudden expansion in the duct 300 at the expansion angle 303 causes flow separation and a reverse flow at the exit of the duct expansion portion 302. The flow separation and reverse flow disadvantageously subjects the tube banks to hot spots and causes a significant reduction in HRSG efficiency.

SUMMARY

The present disclosure provides flow distribution systems and methods. In certain embodiments these flow distribution systems and methods are implemented for the heat recovery steam generation inlet expansion ducts. The flue gas in the inlet expansion ducts goes through a sudden expansion at a rate of 475 kg/s prior to impinging on the super heater tubes bank for the heat recovery steam generator. Flow distribution devices in accordance with example embodiments disclosed herein help produce a uniform flow pattern at the duct exit.

In accordance with the present disclosure, certain implementations produce homogenized flow at the outlet of the inlet expansion duct to avoid possible hot spots on the tubes bank and back pressure on the gas turbine. Accordingly, embodiments disclosed herein provide a new flow distribution device or flow correction device that reduce pressure drops with little modification on the inlet expansion duct for the heat recovery steam generator.

Embodiments provided herein advantageously enhance the flow upstream of the super heater tube banks. However, each device can be associated with a different pressure drop and velocity RMS at the outlet of the inlet expansion duct. Hence, optimum selection for flow distribution devices in accordance with particular implementations depends on the heat recovery steam generator, the allowable pressure drop, and the RMS value.

Some embodiments provide a flow distribution device including a duct including an expansion portion extending from an inlet portion. The expansion portion has a larger cross-sectional area than the inlet portion. The device also includes a guide vane having a curved surface. The guide vane is positioned in the duct to extend from at least a part of the inlet portion into the expansion portion.

In some implementations, the guide vane extends laterally across the duct from a first sidewall of the duct to a second side wall of the duct.

In some implementations, the guide vane is positioned adjacent to a sidewall of the duct.

In some implementations, the duct includes a rectangular cross section.

In some implementations, the duct is formed from sections having straight side walls.

In some implementations, a side wall of the duct forms a point at a transition between the expansion region and the inlet region.

In some implementations, the guide vane extends around the point.

In some implementations, the guide vane is positioned adjacent to the point.

In some implementations, the guide vane is positioned in the range of 10 mm to 1000 mm from the point.

In some implementations, the guide vane is positioned at least one of 10 mm, 50 mm, 100 mm, 150 mm, 200 mm, 250 mm, 300 mm, 400 mm, 500 mm, 700 mm, 800 mm, and 1000 mm from the point.

In some implementations, the guide vane is 2 meters long.

In some implementations, the guide vane has a radius of curvature of 0.25 meters.

In some implementations, the guide vane has a thickness at a first end of 0.15 m.

In some implementations, the guide vane is composed of metal.

In some implementations, the guide vane is composed of sheet metal.

In some implementations, the guide vane is composed of a nonmetallic composite material.

In some implementations, the inlet region is coupled to a turbine exhaust.

In some implementations, the expansion region is coupled to a heat recovery steam generator.

In some implementations, the expansion portion is fluidly coupled to a super heater of the steam generator, the superheater including a bank of tubes.

In some implementations, the guide vane is perforated.

In some implementations, the guide vane includes a plurality of perforations having a plurality of different sizes.

Various embodiments provide a method of distributing flow in a duct. The method includes causing exhaust from a turbine to flow into an inlet portion of the duct. The method includes causing the exhaust to flow about a guide vane having a curved surface as the exhaust moves from the inlet portion of the duct to an expansion portion of the duct. The expansion portion of the duct has a larger cross-sectional area than the inlet portion of the duct.

In some implementations, the expansion portion is fluidly coupled to a super heater of a steam generator, the superheater including a bank of tubes.

In some implementations, the exhaust from the turbine has a flow velocity between 50 and 200 m/s at an exit of the expansion portion.

In some implementations, causing the exhaust flow about a guide vane causes a pressure drop in the range of 130 Pa to 180 Pa as the flow moves across the expansion region.

In some implementations, the method includes maintaining the exhaust flow between 500° C. and 600° C.

Various embodiments provide a flow distribution device comprising a guide vane having a curved surface.

The details of one or more embodiments of these systems and methods are set forth in the accompanying drawings and the description below. Other features, objects, and advantages of these systems and methods will be apparent from the description and drawings, and from the claims.

DETAILED DESCRIPTION

Figure 1:
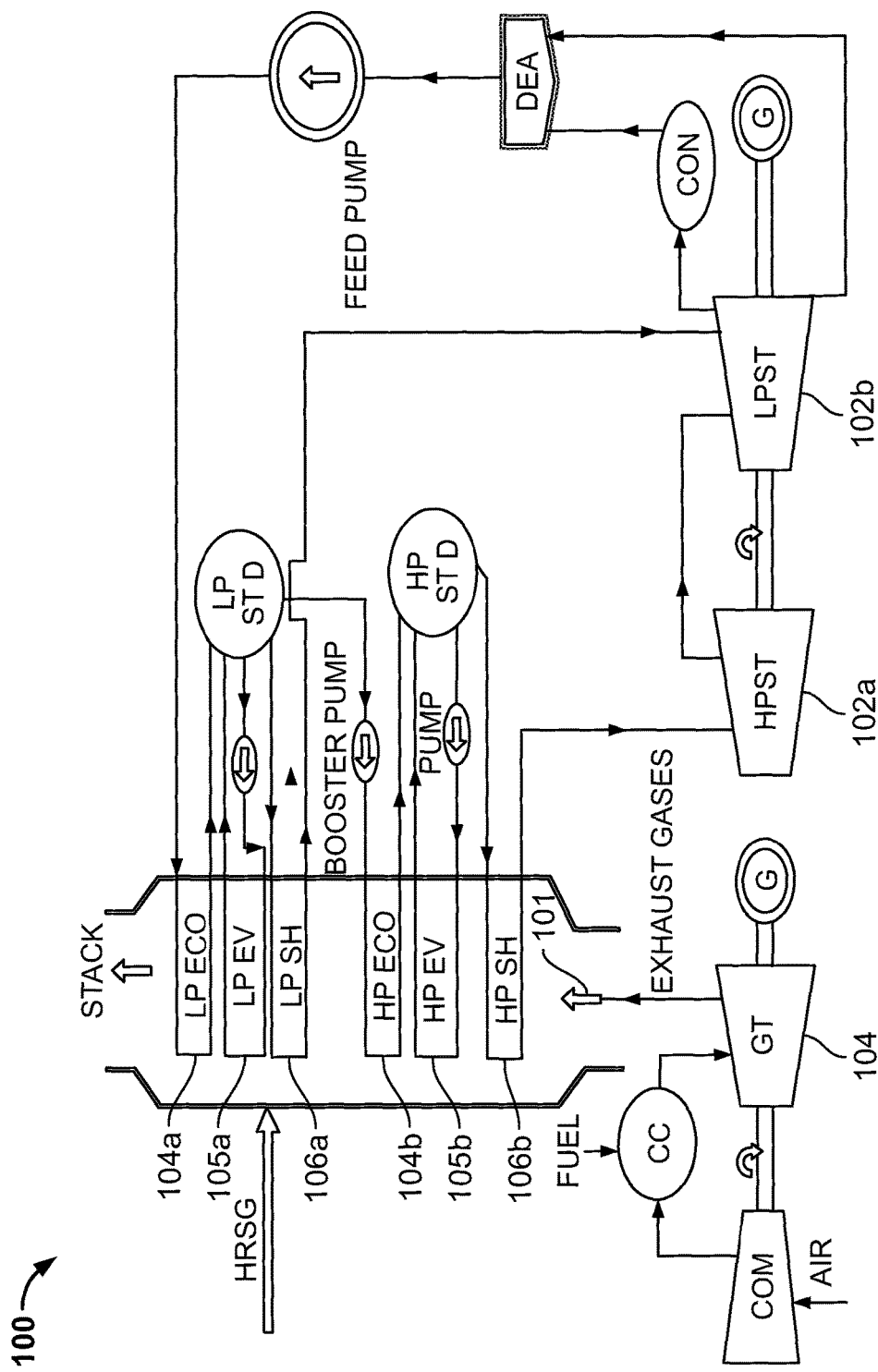
FIG. 1 shows a combined cycle plant with two stage pressure HRSG.
Figure 2A:
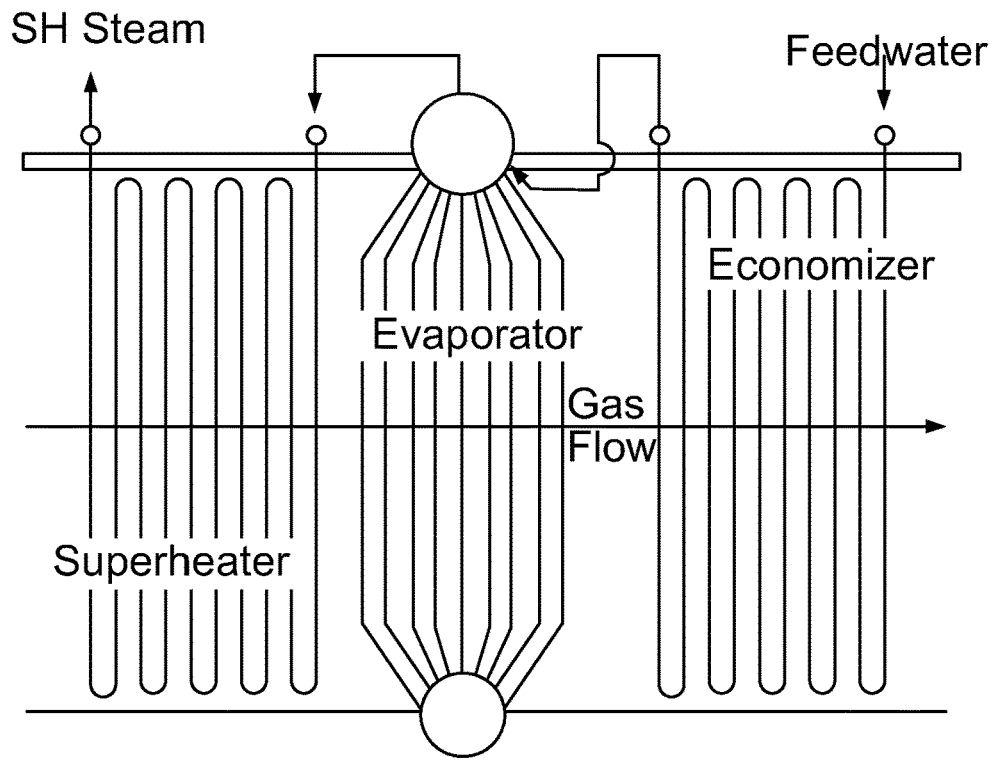
FIGS. 2a and 2b show vertical gas flow arrangements.
Figure 2B:
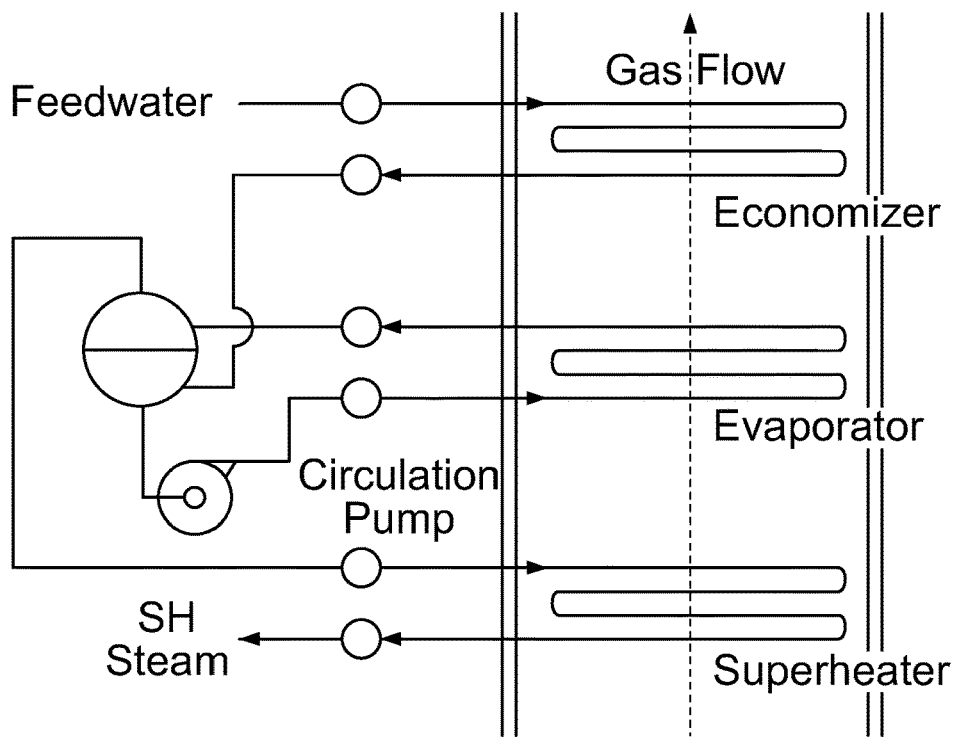
Figure 3:
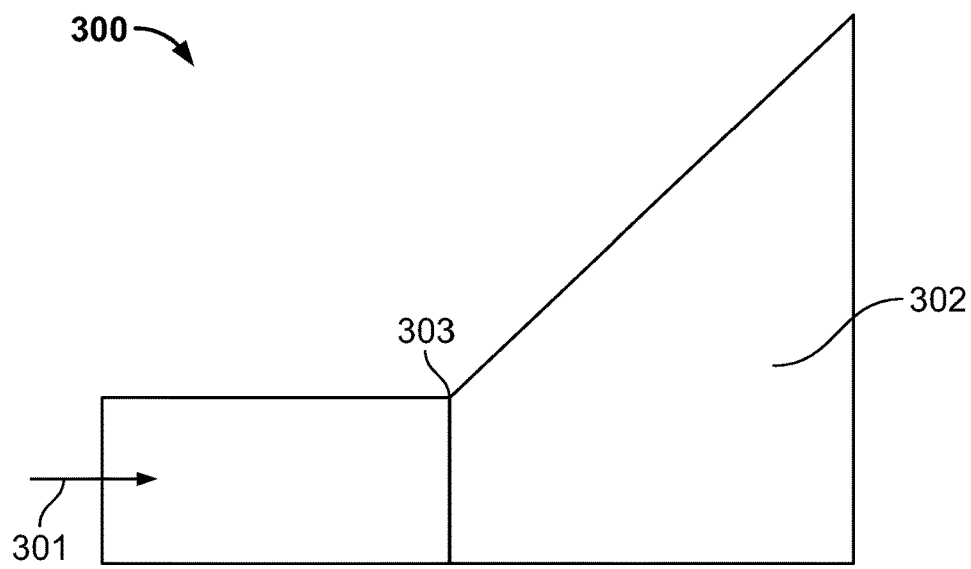
FIG. 3 shows a HRSG inlet expansion duct for fluidly coupling exhaust gas flow from a gas turbine to the HRSG system.

There are different approaches for predicting turbulent flow, depending on the application. Each approach generally has to comply with the conservation of mass, momentum and energy. The conservation of any quantity implies that total change inside a control volume is counted to the net effect for the transported quantity. Each approach has been designed to solve the Navier-Stokes equations with different accuracy level driven by the computational resources required to produce the solution. For instance, direct numerical simulation (DNS) and large eddy simulation (LES) produce high accuracy solutions compared to Reynolds averaged Navier Stokes (RANS) equations. However, the cost associated to obtain DNS is proportional to $Re^3$ or higher. In fact, DNS is used to produce new turbulence models and enhance existing models. On the other hand, LES can be used to produce results with considerably less grid density than DNS, but it requires additional computational analysis compared to RANS approach.

Direct Numerical Simulation

Direct numerical simulation (DNS) has gone through several developments since it was presented in 1970s by Orszag and Patterson. The DNS is considered as a research tool to develop and generate turbulence models that are computationally reasonable and affordable. However, engineering issues can be solved using DNS with the availability of super computers and cluster. The DNS solves the Navier-Stokes equations numerically with most accurate flow behaviour in space and time. This approach shall capture all flow behaviour from the smallest Kolmogorov length scale $\eta$ to the integral scale L.

$$\eta = \left(\frac{v^3}{\varepsilon}\right)^{\frac{1}{4}}$$

However, the challenge of memory availability still exists as huge amounts of data from a very fine grid need to be stored and computed with highly efficient computational process. This limits the use of DNS to low Reynolds number problems and mainly to calibrate and develop turbulence models.

Large Eddy Simulation

The accuracy of large eddy Simulation (LES) can be considered between Direct Numerical Simulation and Reynolds averaged Navier Stokes approach. The theory of LES is to use filtering functions, such as box or Gaussian filters, to solve for large eddies, and implicitly solves for small eddies utilizing sub grid scale. This increases LES accuracy and the results produced from LES can be ranked between DNS and RANS. The Kinetic energy k is mainly stored in the large eddies, which does not get affected by molecular viscosity. Conversely, the dissipation rate is mostly carried by the smaller eddies that take the power from larger eddies.

Reynolds Averaged Navier Stokes

Reynolds Averaged Navier Stokes (RANS) approach was presented by Reynolds in 1895 to solve for turbulence flow problems by splitting the mean and fluctuating variable of the flow. RANS requires coarser grid compared to LES or DNS that made it useful engineering tool to predict the flow for simple and difficult geometry. RANS have gone through much development to improve accuracy. Linear eddy viscosity (LEV), non-linear eddy viscosity (NLEV), and Reynolds stress Model (RSM) are well known models that the literature has presented with a high degree of agreement between experimental and calculated prediction.

Linear Eddy Viscosity

The concept of linear eddy viscosity (LEV) approach is to approximate the Reynolds stresses for RANS using linear relations. For example, Boussinesq relation is the most accurate linear form of Reynolds stresses which can be written as:

$$u_i u_j = \frac{2}{3} k \delta_{ij} - v_T \left(\frac{\partial U_i}{\partial x_j} + \frac{\partial U_j}{\partial x_i}\right)$$

where $v_T$ and k is turbulent viscosity and kinetic energy respectively are given by $$v_T = l_m^2 \sqrt{\left(\frac{\partial U_i}{\partial x_j} + \frac{\partial U_j}{\partial x_i}\right)^2}$$

$$k = \frac{1}{2} u_i u_i$$

The mixing length $l_m$ is the ratio between the kinematic turbulent viscosity and turbulent velocity. In fact, turbulent kinetic energy is stored in the large eddies, hence, the mixing length is representing large eddies in the flow.

One Equation Model

The one equation model typically solves for the turbulent kinetic energy k, but it can be for any turbulent transport variable. Prandtl presented the first form of this model where the production balances with dissipation. The one equation model can be written as $$\frac{Dk}{Dt} = \tau_{ij} \frac{\partial U_i}{\partial x_j} - C_D \frac{k^{\frac{3}{2}}}{l} + \frac{\partial}{\partial x_j}\left[\left(v + \frac{v_T}{\sigma_k}\right)\frac{\partial k}{\partial x_j}\right]$$

$$v_T = C_D \frac{k^2}{\varepsilon}$$

$$\varepsilon = C_D \frac{k^{\frac{3}{2}}}{l}$$

where $\tau_{ij}$ is Reynolds stress tensor and it is given by:

$$\tau_{ij} = 2 v_T S_{ij} - \frac{2}{3} k \delta_{ij}$$

$$S_{ij} = \frac{1}{2}\left(\frac{\partial U_i}{\partial x_j} + \frac{\partial U_j}{\partial x_i}\right)$$

The right hand side of the equation consist of production, dissipation and diffusion rate consecutively. The values for the constants in the equation, $C_D$ and $\sigma_k$, differ from one model to other. Results for $\sigma_k=1$ and $C_D$ values from 0.07 and 0.09 are generally acceptable. The dissipation rate balances the production rate in equilibrium flows. There are several advantages of this model because of its simplicity and this model does not require massive computing resources; however, this model can be inappropriate for separated and recalculated flow.

The flue gas in the heat recovery steam generator inlet expansion duct will separate due to an adverse pressure gradient on the duct expansion. The stream lines pattern will be disturbed and will not be nearly parallel as the case for attached flow. Therefore, selecting another turbulent model facilitates solving for the separation and the reattachment flow. Hence, two equations model were selected to solve for flue gas in the inlet expansion duct.

Two Equations Models

An additional equation has been introduced to solve for two transport variables in turbulent flow. This was established to solve in two equations models, one of them is turbulent kinetic energy k in most models, and the other equation differs for different transport variable. The most common second equation is dissipation ε or specific dissipation ω which solve for turbulent either length or time scale.

The k-ε model is well established and widely validated model and shows high degree of agreement with the experimental and DNS results. The standard k-ε model can be written as:

$$\frac{Dk}{Dt} = P_k - \varepsilon + \frac{\partial}{\partial x_j}\left[\left(v + \frac{v_T}{\sigma_k}\right)\frac{\partial k}{\partial x_j}\right]$$

$$\frac{D\varepsilon}{Dt} = C_{\varepsilon 1}\frac{\varepsilon}{k}P_k - C_{\varepsilon 2}\frac{\varepsilon^2}{k} + \frac{\partial}{\partial x_j}\left[\left(v + \frac{v_T}{\sigma_\varepsilon}\right)\frac{\partial \varepsilon}{\partial x_j}\right]$$

where $P_k$ is a production term and ε is a dissipation term that are given by $$P_k = -u_i u_j \frac{\partial U_i}{\partial x_j}$$

$$\varepsilon = C_u \frac{k^{\frac{3}{2}}}{l}$$

The constants in the equations are designed for simple shear flow, and it has to be examined and compared to DNS results for accuracy. Values in Table 1 can be applied for the constants in the two equations model.

TABLE 1 constant values for k-ε model (Launder and Spalding 1974)

| $C_u$ | $C_{\varepsilon 1}$ | $C_{\varepsilon 2}$ | $\sigma_k$ | $\sigma_\varepsilon$ |
|---|---|---|---|---|
| 0.09 | 1.44 | 1.92 | 1 | 1.3 |

The first equation, the k equation, in the two equations model is used to predict the production and destruction, while in the second equation, the ε equation, ε increases rapidly with the increase of k and decreases very quickly to prevent unphysical solutions for turbulent kinetic energy. However, this might work against the model as the weak shear layer gets amplified causing unwanted overestimating for the turbulent kinetic energy. Therefore, a damping function $f_u$ is introduced to decrease the turbulent viscosity and minimize the over-prediction in the turbulent energy in the near wall region.

$$v_T = C_u f_u \frac{k^2}{\varepsilon}$$

Figure 4:
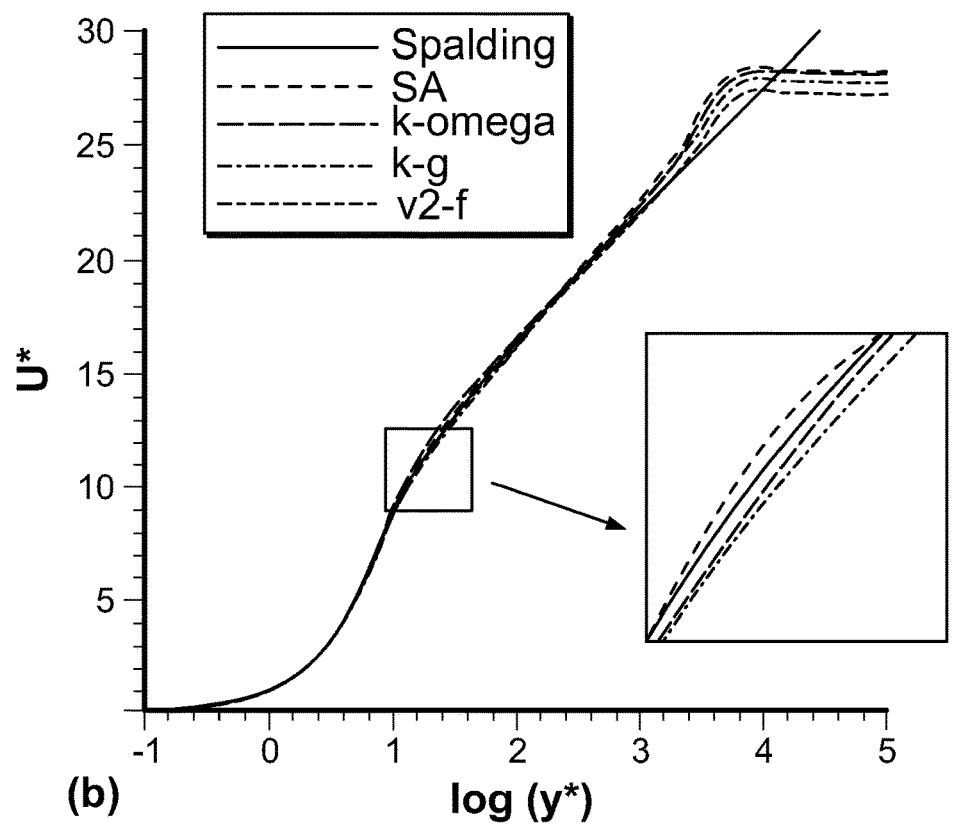
FIG. 4 illustrates different damping functions.

FIG. 4 provides a graph illustrating different damping functions and the results of the damping functions compared to Spalding graph results at Re value of 7700.

The solution for any fluid flow problem starts from knowing and identifying the boundary conditions associated with it. This is a very critical step as any wrong input will lead to unrealistic solutions. The aforementioned two equation models require only the initial condition for the turbulent problem to be solved. This makes the turbulent prediction easy, however, the model does not work well with slightly curved surfaces, swirling, or rotating flow.

Wall Function

The sole motive for wall function development is to eliminate the computational analysis in a viscous sub layer that require a huge number of much fined cells. The computational cost can be reduced dramatically with the wall function as it is based on the universal wall log-law that places the first node outside viscous sub layer. Local equilibrium between production and dissipation rate is used to estimate the wall shear stress using the improved log-law relations given by $$U^* = \frac{1}{\kappa^*}\log(E^* y^*)$$

$$U^* = \frac{U_p k_p^{1/2}}{(\tau_w/\rho)}$$

$$y^* = \frac{y_p k_p^{1/2}}{v}$$

where $U_p$ is fluid velocity at the node P, $\tau_w$ is wall shear stress on the $U_p$ direction, E is wall roughness value (for a smooth wall E=9.0), $y_p$ is the distance for the first node from the wall, and $k_p$ is the turbulent kinetic energy in the fully turbulent region.

The wall function has become preferable to generate a solution for engineering problem as it requires much less computational resources. In addition, the wall function is designed to solve for separation and reattachment flow as the turbulent viscosity cannot be equal to zero close to the walls when the wall shear stress is vanished. The turbulent viscosity can be calculated using the relation below:

$$uv = \frac{\tau_w}{\rho} = \frac{\kappa^* U_p k_p}{\log(E^* y^*)}$$

$$v_T = \frac{\frac{\tau_w}{\rho}}{\frac{\partial U}{\partial y}} = \kappa * k_p^{\frac{1}{2}} y_p$$

Figure 5:
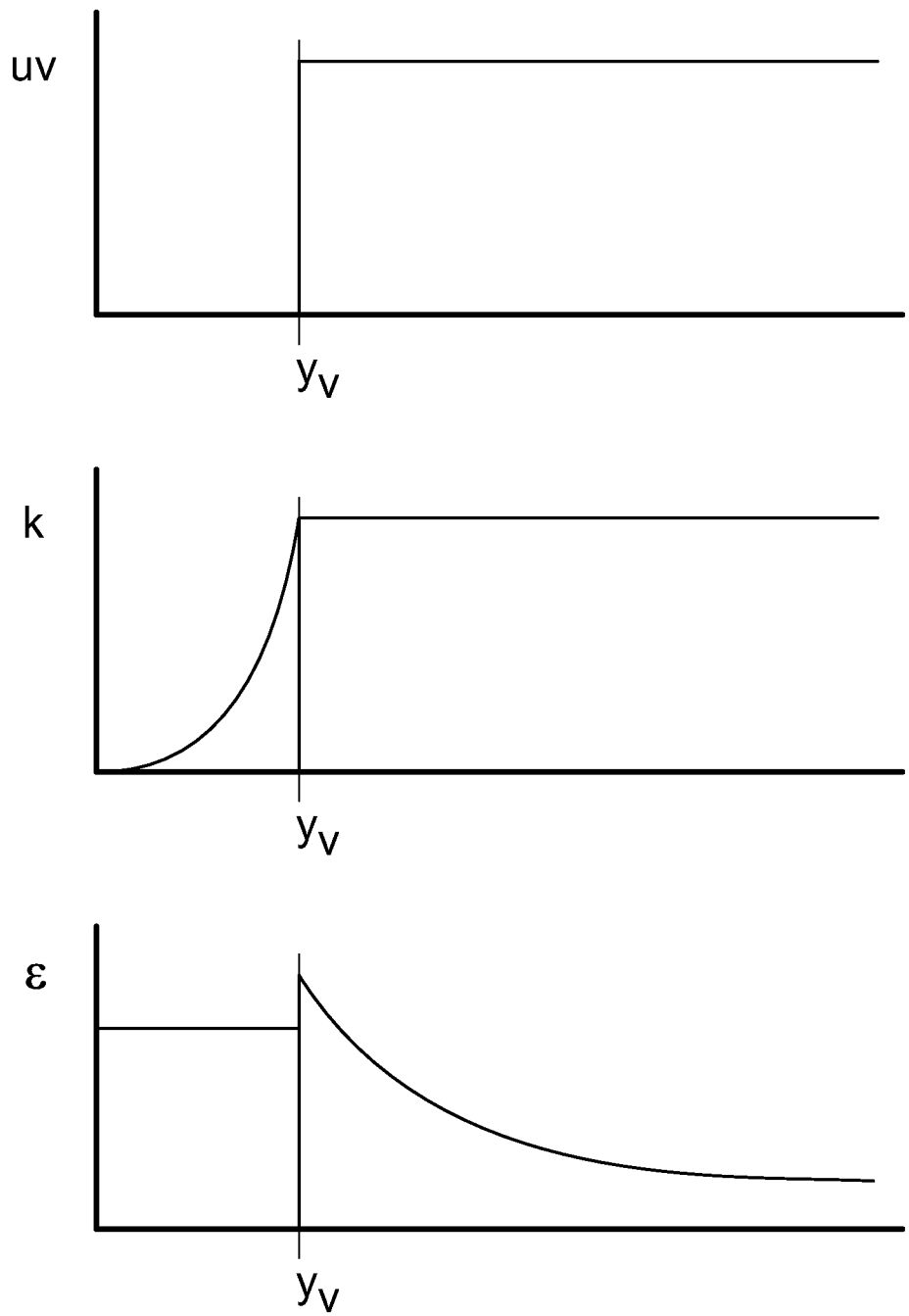
FIG. 5 shows approximations for developing a wall function.

There are some approximations that are used for developing wall functions. FIG. 5 shows some graphs representing some of the approximations used for developing wall functions that are applied in the viscous sub layer. For example, in one approximation the shear stress is approximated as zero in the viscous sub layer region and equal to wall shear stress in the fully turbulent region. Also, the turbulent kinetic energy may be approximated as being constant in the fully turbulent region and slowly going to zero in viscous sub layer. In addition, the dissipation may be approximated as following a linear relation in the aforementioned region.

Flow inside an HSRG inlet expansion duct fluidly coupling exhaust gas flow from a gas turbine to the HRSG system is expected to separate due to adverse pressure gradient because of the sudden expansion. Accordingly, embodiments disclosed herein are directed to achieving the best flow pattern at the exit of the HSRG inlet expansion duct for pre-specified duct geometry.

Simulations of disclosed embodiments were done using Fluent, a commercial computational fluid dynamics (CFD) package.

The disclosed embodiments help maximize heat transfer in the tube banks coupled to the HSRG via homogenising the flow at the duct exit. Additionally, various embodiments control the pressure drop to help reduce and/or eliminate backflow possibility.

There are different types of ducts that can be used in the heat recovery steam generator. The selection of the duct depends on different parameters such as the size of both the HRSG and the gas turbine, land use permit, and other parameters. In this disclosure, square inlet expansion ducts are illustrated; however, embodiments of the present invention are not limited to ducts having square inlets.

Figure 6:
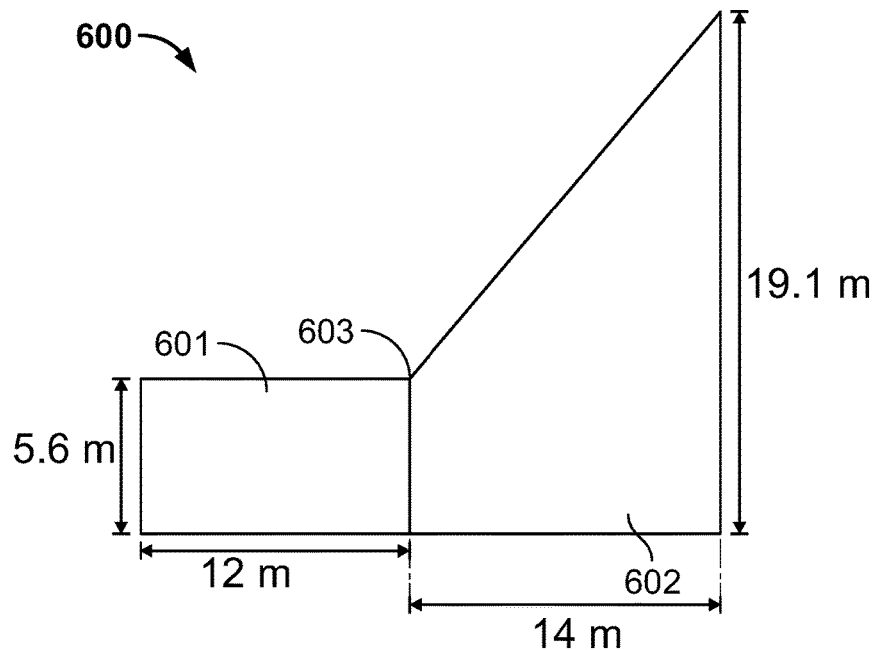
FIG. 6 shows the dimensions for an inlet expansion duct provided in certain implementations.

FIG. 6 provides a side cross-sectional view of an inlet expansion duct 600 of a square duct HRSG. FIG. 6 shows the dimensions for the inlet expansion duct 600 provided in certain implementations. The inlet expansion duct 600 has a duct inlet portion 601 having a height of 5.6 meters and a length of 12 meters. The duct expansion portion 602 begins at expansion angle 603 where the duct expansion portion 602 forms an angle with respect to the duct inlet portion 601. The duct expansion portion 602 expands from the height of 5.6 meters to 19.1 meters over a length of 14 meters.

Boundary Conditions

The boundary conditions implemented in accordance with tests described in the present disclosure were determined from the common HRSGs used in the industry. The working fluid is the combustion exhaust that leaves the gas turbine and enters the HRSG at high turbulence intensity varies from 10% to 30%. The exhaust gas mixture composition that is received by the HRSG is given in Table 2.

TABLE 2

| flue gas chemical composition | |
|---|---|
| Molecular | percentage composition by volume |
| $N_2$ | 72.6% |
| $O_2$ | 12.9% |
| $CO_2$ | 3.3% |
| $H_2O$ | 11.2% |

In fact, the flue gas is Nitrogen dominant by 72.6%, therefore, the flue gas will be approximated as air since air properties are readily available at the same temperature. The flue gas enters at 560° C. and a flow rate of 475 kg/s. Also, the walls are considered as adiabatic and no heat exchange between the flue gas and the ambient condition. In addition, the thickness of the perforated plate is 10 mm and it will be considered as porous zone for different porosity of 40%, 50% and 60%.

Grid Generation

Numerical simulation, using finite volume method, starts with discretizing the geometry into small volumes to run the iterative method for the solution to converge. Commonly, mapped structures will produce better results compared to other meshing technique. In fact, the accuracy of the produced result is heavily dependent on the generated mesh. This has to be managed very carefully as the computational cost and time may change very dramatically with unnecessary mesh refinement.

Figure 7:
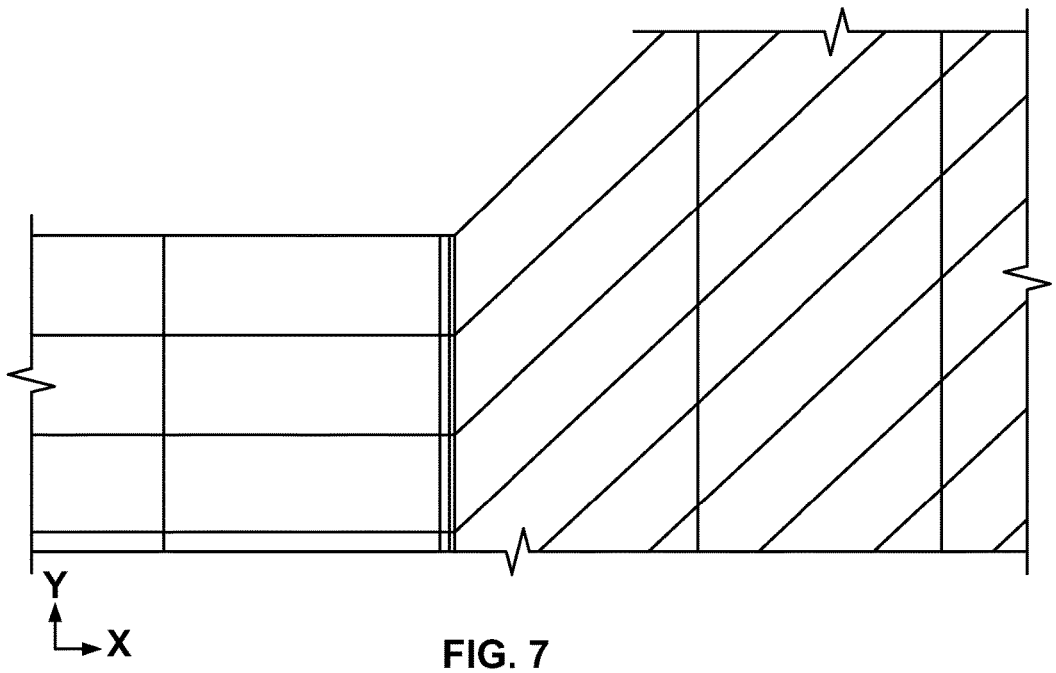
FIG. 7 shows a mapped body fitted structured grid that has been used to evaluate an inlet expansion duct implementing a perforated plate.
Figure 8:
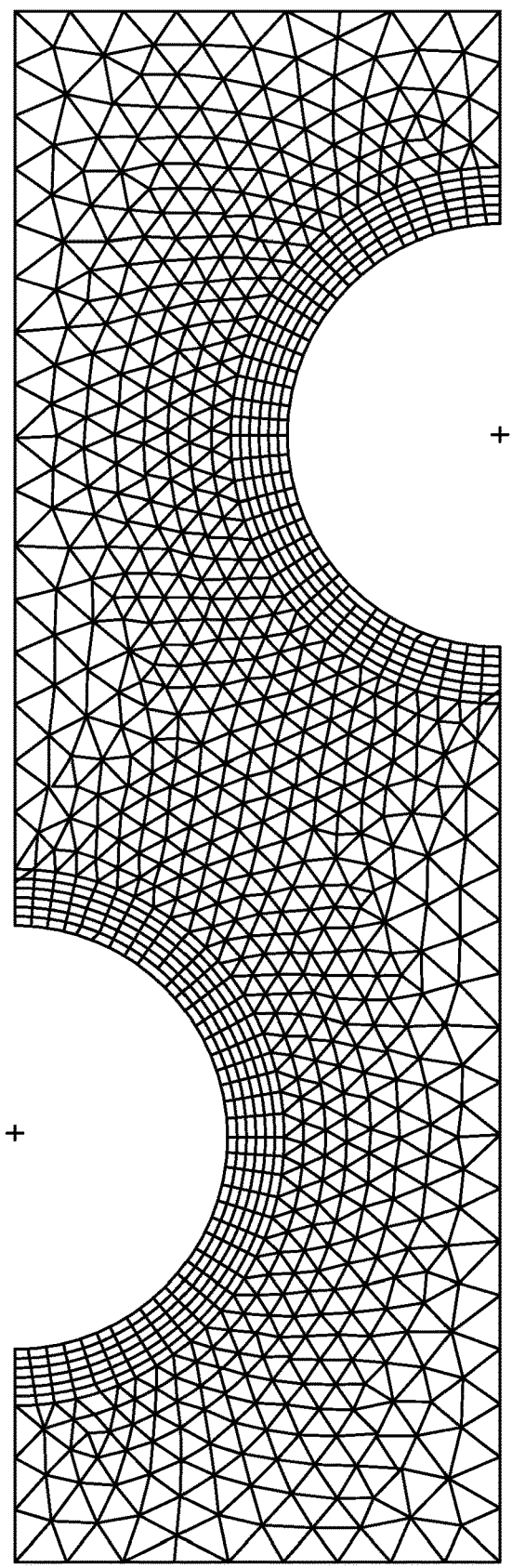
FIG. 8 provides an unstructured mesh providing additional flexibility for meshing difficult geometries.

A body fitted grid is normally very difficult to implement for every geometry, especially when it consists of difficult curvatures. However, block structured grids are normally used instead of body fitted grid because block structured grids apply meshing for different parts of the geometry then it precisely joins each mesh. FIG. 7 shows a mapped body fitted structured grid that has been used to evaluate one case of a perforated plate at the expansion inlet. On the other hand, unstructured grids shown in FIG. 8 provide additional flexibility for meshing difficult geometry. There are two discretization methods, one of them is cell centered where the node is at the center of the cell, while the other is vertex centered and assigns the vertex as a node.

Solution Control There are different velocity-pressure couplings in Fluent for single phase steady state flow. The analysis described by the present application implements the coupled algorithm, which is recommended for large time step. In fact, other methods separate the momentum equations and pressure continuity equations in the solution, in contrast to the coupled algorithm that join them. Also, an under relaxation factor is used to stabilize and expedite the convergence for the solution. A default under relaxation factor is used for the beginning of each case described herein; however, changes may be applied to the under relaxation factor as required to seek for solution convergence.

Results

The results presented in this disclosure are for different flow distribution devices. This disclosure describes a study conducted using 2D simulation for the same geometry on the x-y plane, and different flow distribution devices were selected for each case. The flue gas is approximated as air for simplification. Therefore, flue gas density and viscosity are considered 0.435 Kg/s and $3.7 \times 10^{-5}$ Kg/m s respectively.

The inlet boundary condition is a mass flow rate at 475 Kg/s. Also, the turbulence intensity was assumed as 20% to imitate the exact flow at the turbine exit. The pressure outlet boundary condition is assigned for the outlet of the inlet expansion duct with assumed turbulence intensity of 5%. For each case grid independent solution was examined and the acceptable near wall $y^+$ value is between 30 and 500.

Case 1: 2D Simulation for the Duct without Flow Distribution Devices

Figure 9:
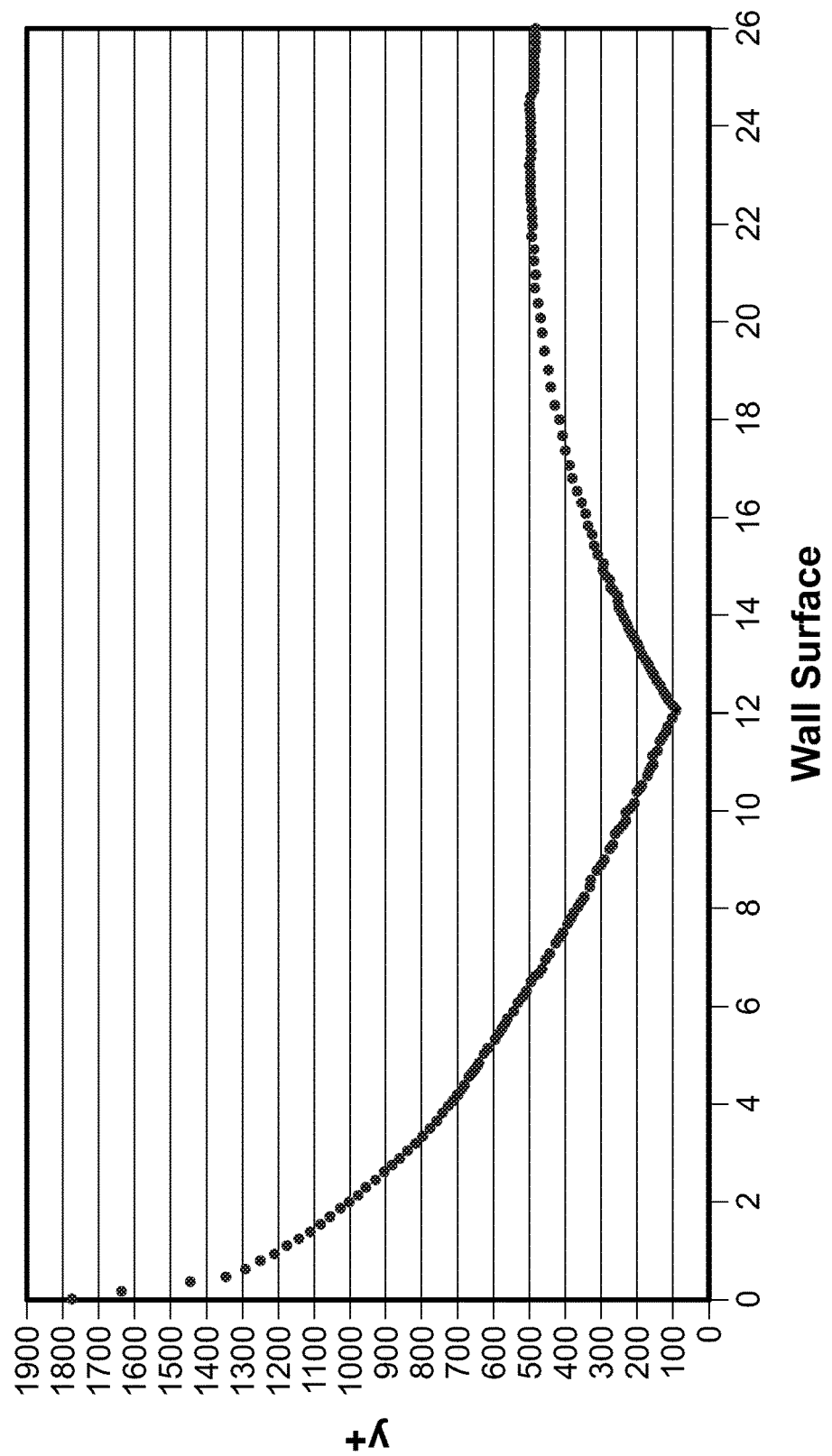
FIG. 9 shows the near wall y+ value.

The first simulation was performed for an inlet expansion duct without any flow distribution devices. The purpose of this is to understand the flow behaviour in the duct expansion. The flow is turbulent inside the duct, hence, two equations k-ϵ model with standard wall function was used as explained earlier. The simulation started with coarse grid then it was refined further to maintain the value of $y^+$ between 30 and 500. The first trial was performed with a coarse mesh that contains 8000 cells. As a result, the value of $y^+$ was found very high and the solution was rejected. After that, the mesh was refined further to 30000 cells and the y+ was found just below 500 as shown in FIG. 9.

The flue gas flow was separated due to extremely high pressure gradient because of the duct expansion. Therefore, the simulation reveals that the flue gas stream is directed to the lower part of the duct expansion portion 602 in FIG. 10 and hence the flue gas stream will be directed toward the lower part of the tube banks of the HSRG, while the upper part is suffering from backflow. Also, it was observed as demonstrated in FIG. 11 that a stagnation pressure is located when the flow separated causing the flow to be squeezed in the lower part of the duct expansion portion 602.

Case 2: 2D Simulation for a 50% Perforated Plate at Different Locations

Figure 12:
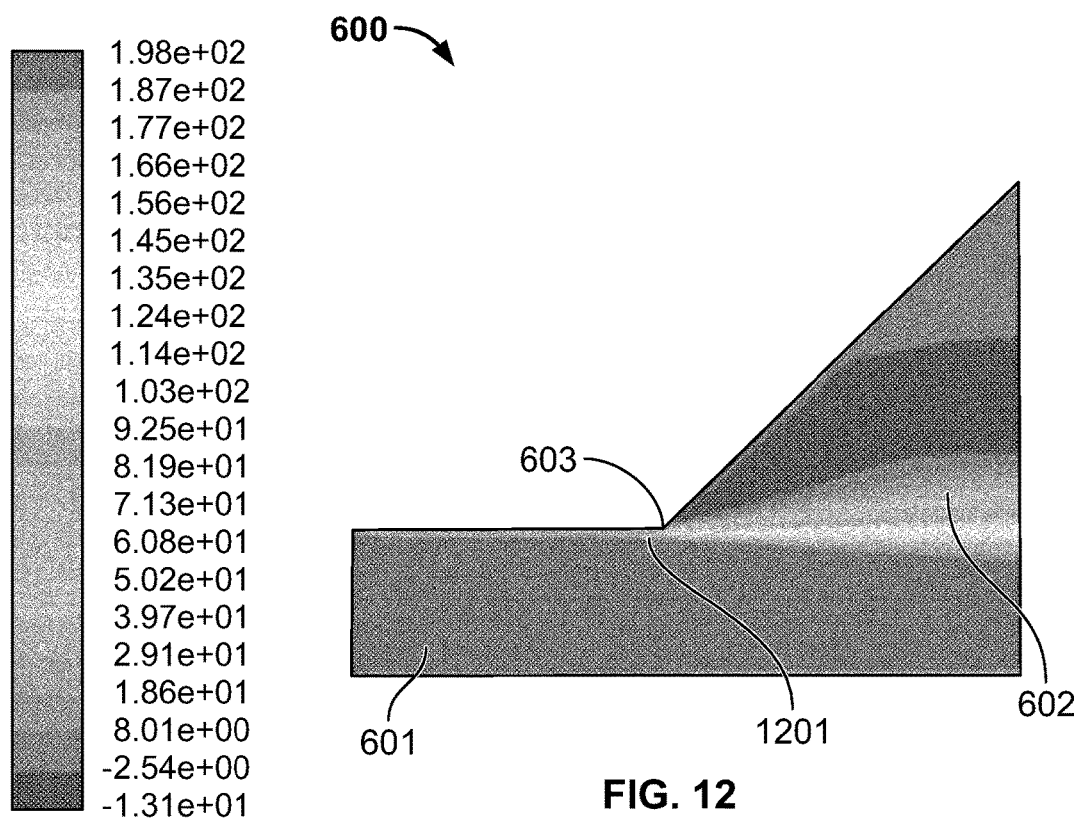
FIG. 12 shows a velocity contour for case 2a with a perforated plate installed at the inlet of the duct expansion portion of the inlet expansion duct.

This case is used to analyze the effect of a perforated plate 1201 in homogenising the flow. First, the perforated plate 1201 was simulated as if it is installed at the inlet of the duct expansion portion 602 of the expansion in case 2a. The simulation shows that the flow pattern before it impinges to the superheaters did not change as shown in FIG. 12. In fact, the flow separation became bigger and the flow characteristics at the outlet have been worsened.

Figure 13:
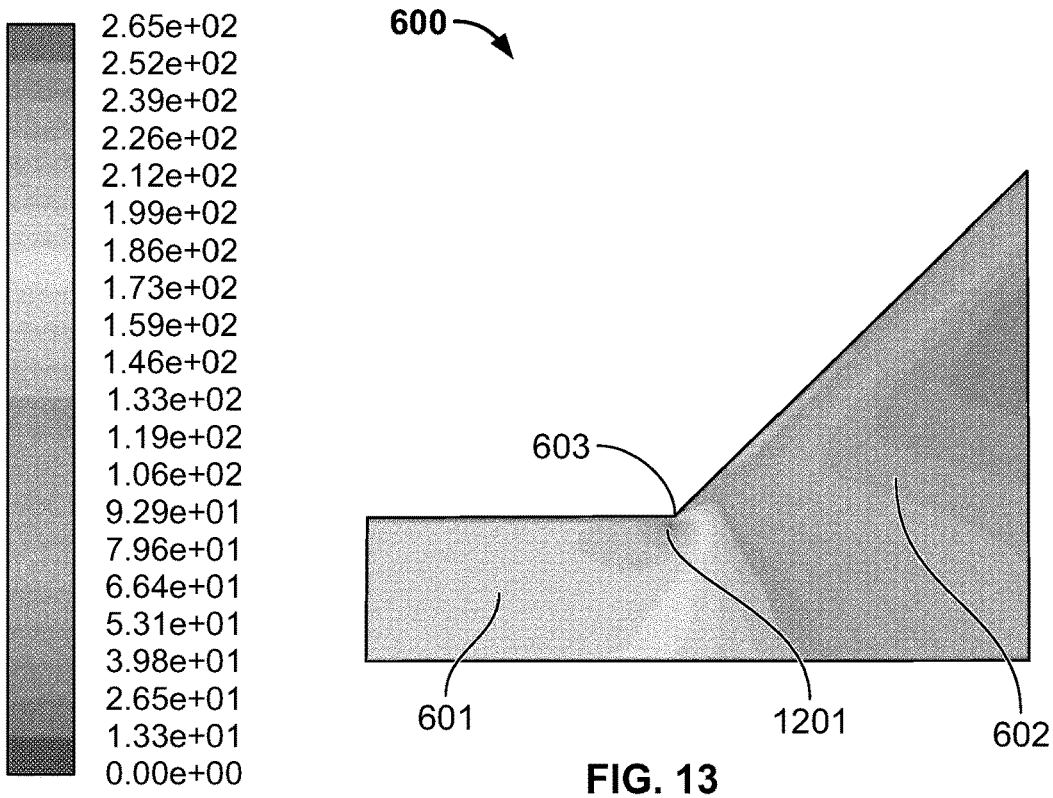
FIG. 13 illustrates a velocity contour for case 2b with a perforated plate installed 2 m from the duct expansion portion of the inlet expansion duct.

Then, the perforated plate 1201 was moved 2 m forward of the inlet of the duct expansion portion 602 in case 2b, as a result, the flow pattern was enhanced as shown in FIG. 13. Also, there are no backflows at the exit of the duct and the separation region was eliminated. The flow has almost a uniform pattern at the exit.

Figure 14:
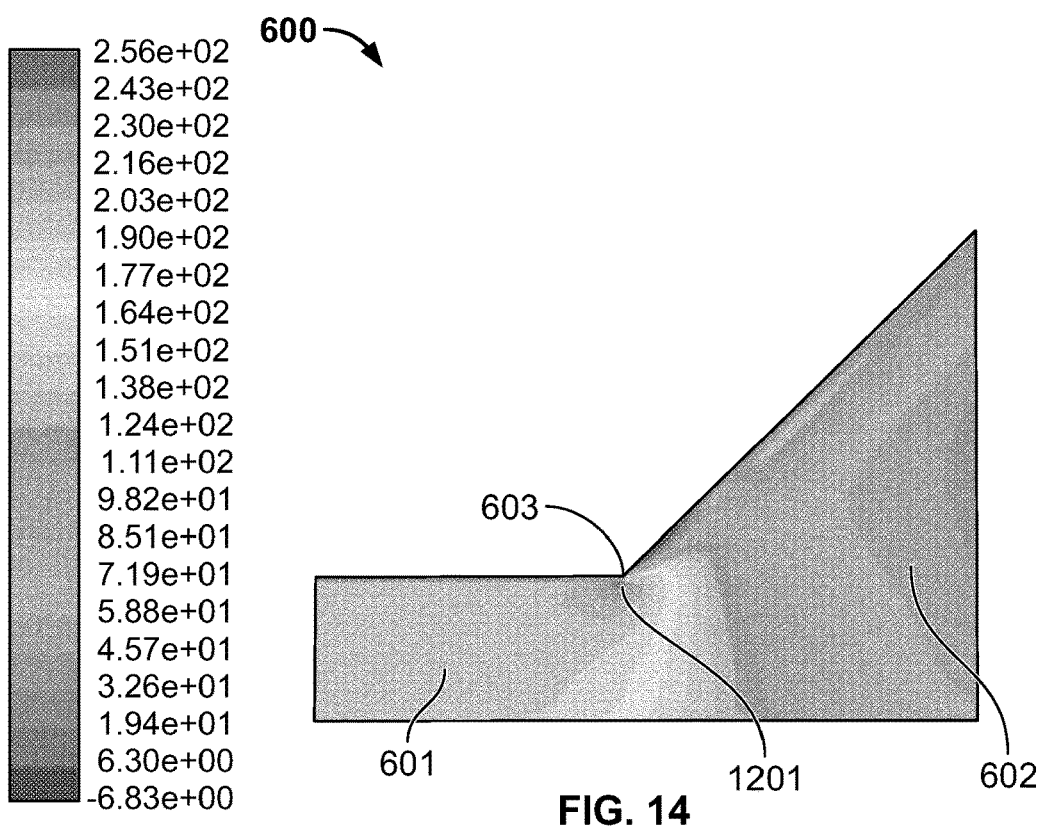
FIG. 14 illustrates a velocity contour for case 2c with a perforated plate installed 4 m from the duct expansion portion of the inlet expansion duct.

FIG. 14 presents case 2c for the perforated plate 1201 effect on the flue gas flow if it is inserted at a distance of 4 m from the expansion inlet. The flow slightly enhanced compared to the case when the perforated plate 1201 was only 2 m from the expansion. The disadvantage of this case is a flow separation that was found between duct expansion portion 601 and the perforated plate 1201.

Case 3: 2D Simulation for Flow Diverter in the Duct

Figure 15:
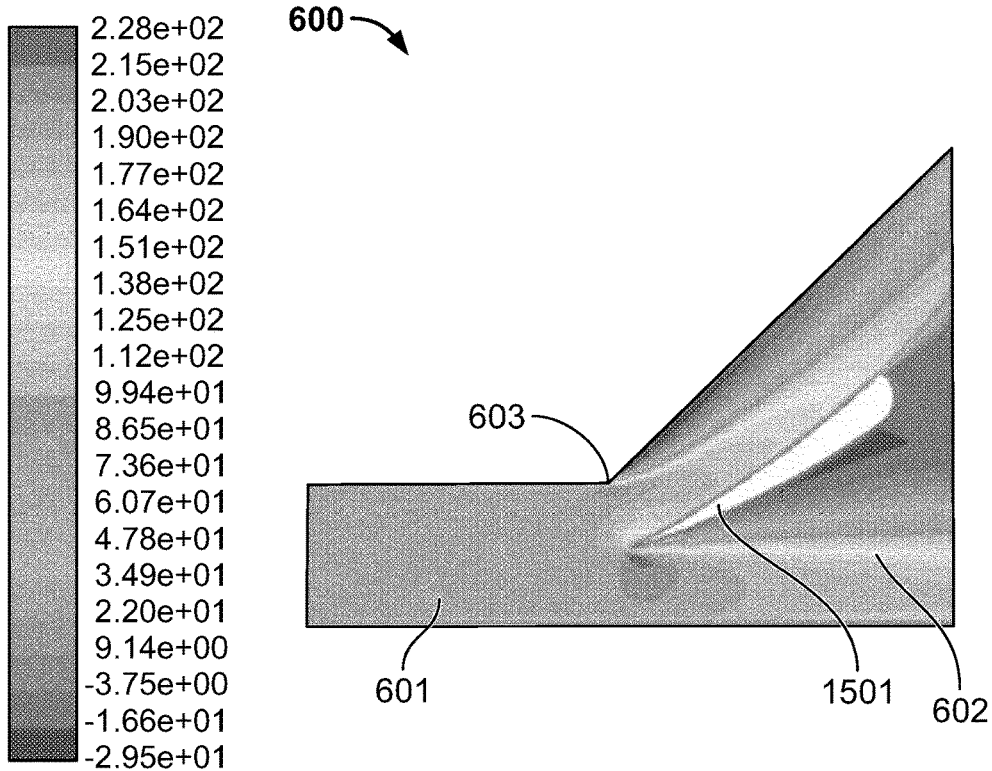
FIG. 15 illustrates a velocity contour for the inlet expansion duct with a flow diverter.

A foreign body, flow diverter 1501, was inserted in the duct 600 that acts as a diverter of the flue gas flow as shown in FIG. 15. FIG. 15 shows that the flow is directed mainly towards the upper part of the super heater tubes bank. The flow diverter 1501, which is formed as a dual angle roof, caused an additional flow recirculation below the diverter due to the insertion of the foreign body. The flow is found reversed in direction in the middle region of the duct outlet.

Case 4: 2D Simulation for Baffles at the Inlet of the Expansion

Figure 16:
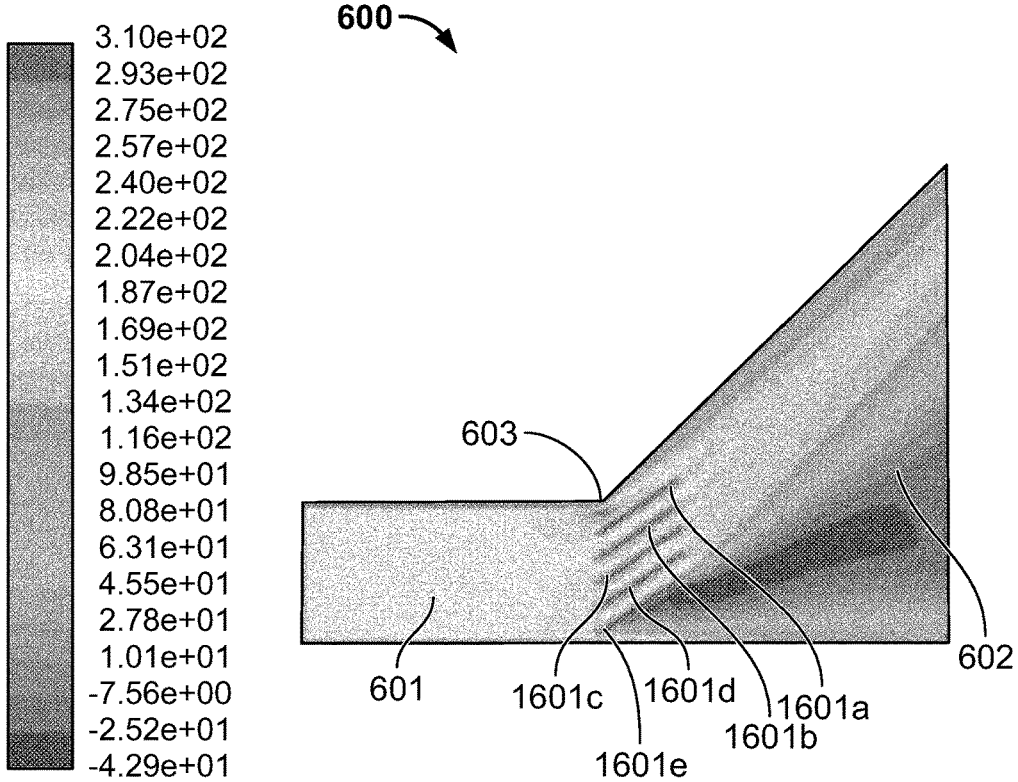
FIG. 16 illustrates a velocity contour for the inlet expansion duct with baffles.

The installation of baffle plates 1601a-1601e caused the flow to be directed with the same angle of baffles. As a result, the flow is directed mainly towards the upper part of the super heater tubes bank as shown in FIG. 16. Also, the vortex shedding of the lowest baffle plate 1601e may worsen the flow. The flow is reversed in the region close to the outlet of the lower part of the duct expansion portion 602.

Case 5: 2D Simulation for a Proposed Guide Vane Installed Under to the Expansion Angle This case is used to analyse a guide vane 1701 to be installed very close to the expansion angle 603. The guide vane 1701 is supported by the sidewall of the inlet expansion duct 600 and extends all the way across the inlet expansion duct 600. The effect of moving the guide vane 1701 away from the expansion angle is discussed herein in further detail. First, in case 5a the gap between the guide vane 1701 and expansion angle 603 is 10 mm. It is noticed in FIG. 19 that the recirculation region has been decreased compared to case 1. However, the upper portion of the duct expansion portion 602 is still suffering from recirculation and reverse flow.

Figure 24:
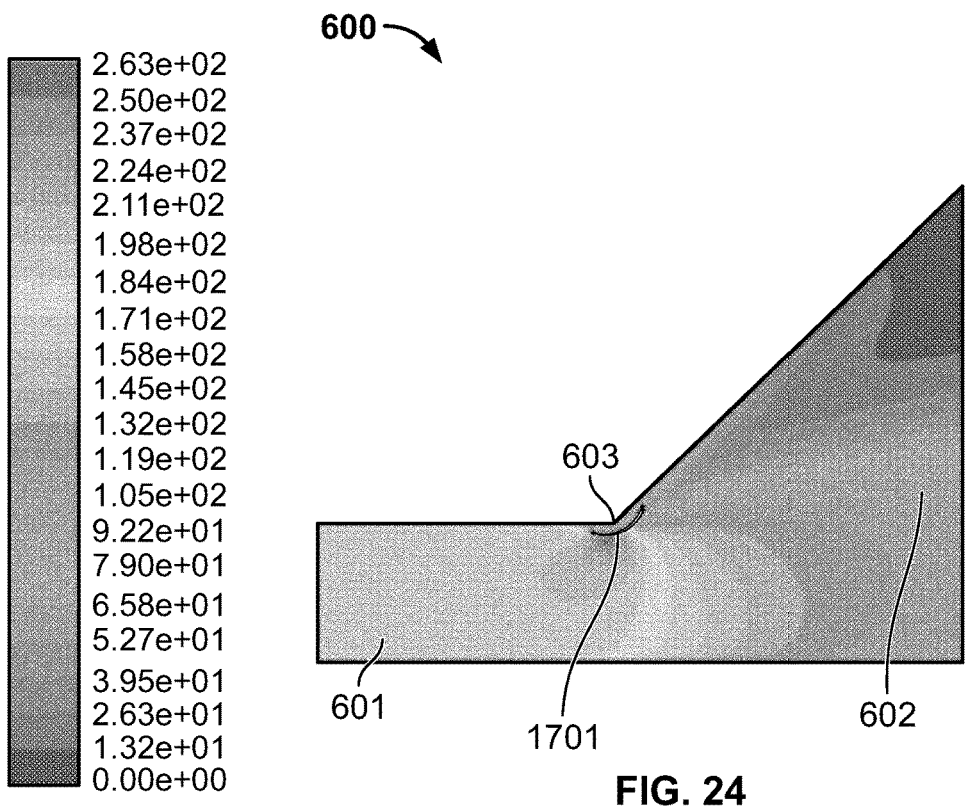
FIG. 24 illustrates the case 5f velocity contour for an inlet expansion duct with a guide vane 250 mm from the expansion angle, in accordance with particular embodiments.
Figure 30:
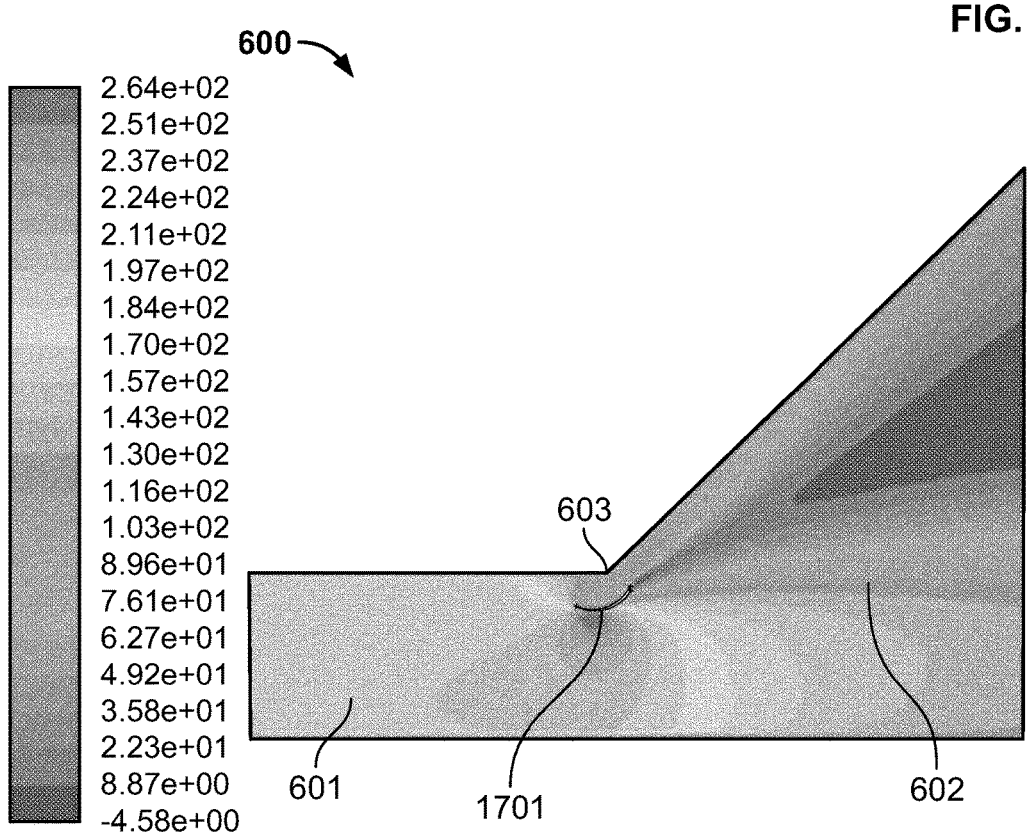
FIG. 30 illustrates the case 5l velocity contour for an inlet expansion duct with a guide vane 1000 mm from the expansion angle, in accordance with particular embodiments.

The gap between the wall and the proposed guide vane 1701 has increased from 50 mm case 5b and is increased up to 1000 mm in case 5l, shown in FIG. 30. As demonstrated by the examples described herein, the flue gas flow behaviour is enhanced at the outlet of the inlet expansion duct 600 as the gap between the guide vane 1701 and the expansion angle 603 increases. Also, the reversed flow and recirculation region was eliminated when the gap is about 150 mm as shown in FIG. 24 for case 5c.

Figure 29:
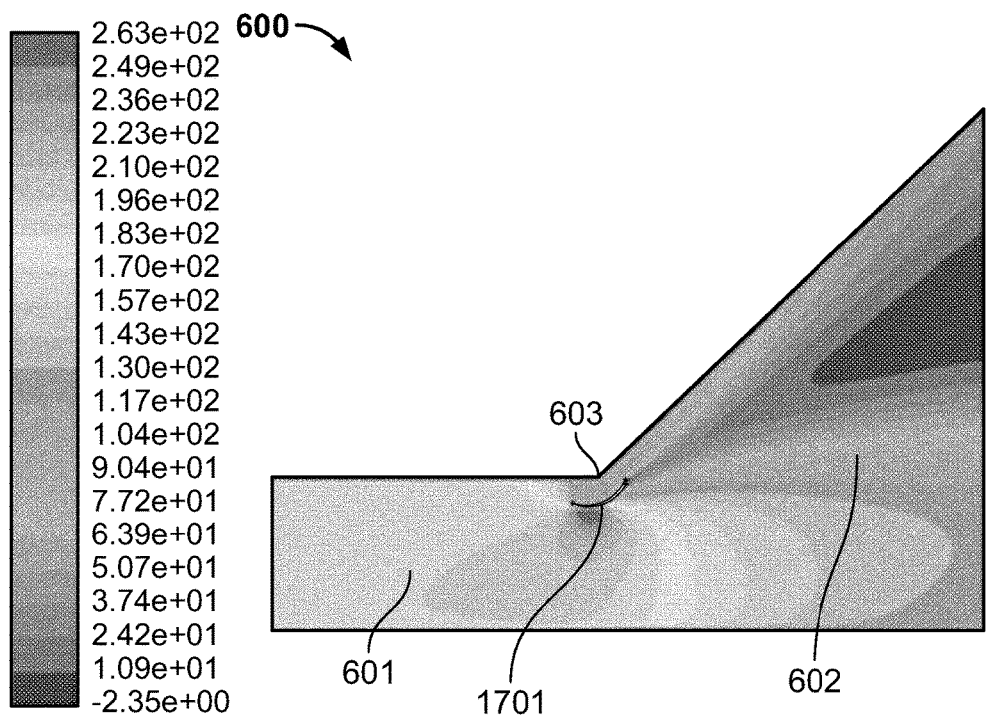
FIG. 29 illustrates the case 5k velocity contour for an inlet expansion duct with a guide vane 800 mm from the expansion angle, in accordance with particular embodiments.

The region with a very low velocity at the top of the inlet expansion duct 600 continues to decrease in size as the distance between the guide vane 1701 and the expansion angle 603 increase to approximately 700 mm. After that, the flow starts to reverse in the duct expansion portion 602 of the inlet expansion duct 600 and the recirculation region starts to increase in size as shown in FIG. 29 and FIG. 30.

Figure 17:
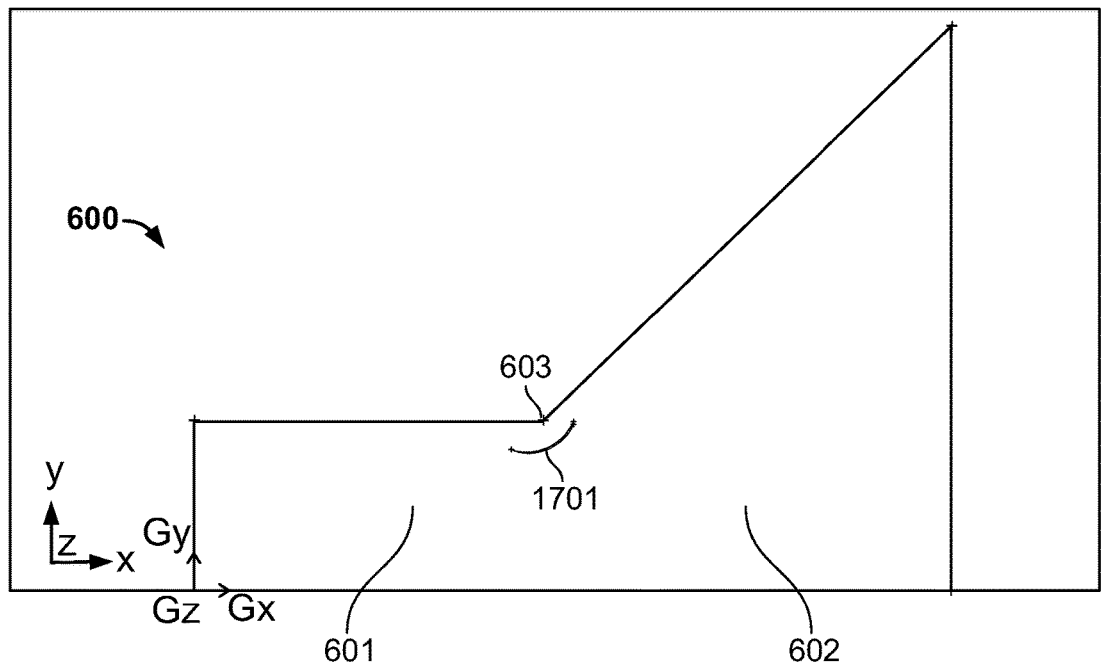
FIG. 17 illustrates the inlet expansion duct including a guide vane, in accordance with particular embodiments.

FIG. 17 illustrates the inlet expansion duct 600 including the guide vane 1701, in accordance with particular embodiments.

Figure 18:
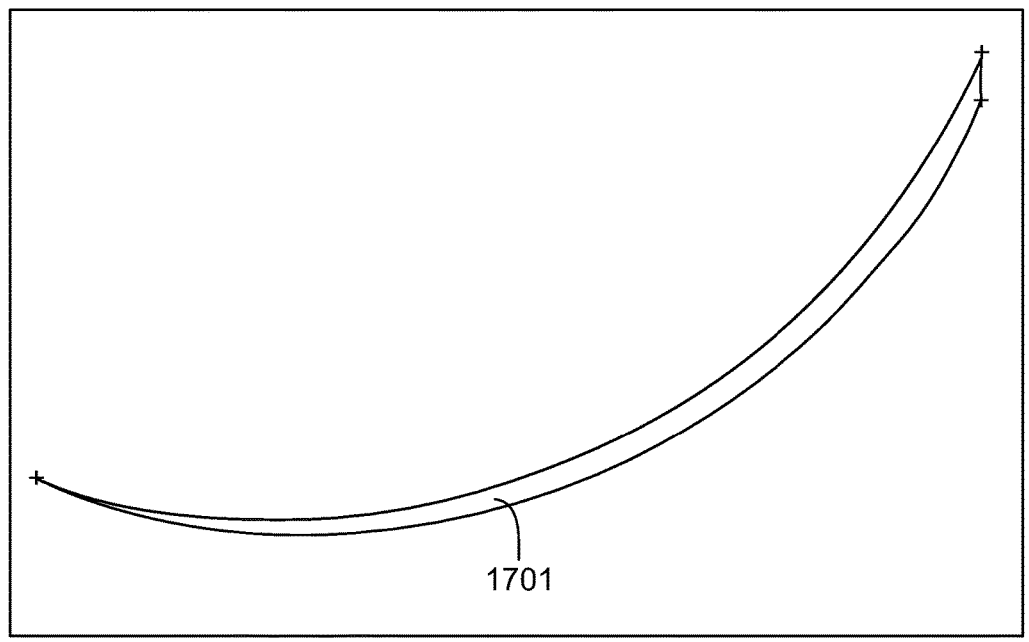
FIG. 18 illustrates a magnified view of the guide vane, in accordance with particular embodiments.

FIG. 18 illustrates a magnified view of the guide vane 1701, in accordance with particular embodiments.

In particular embodiments, the guide vane 1701 is 2 meters long. In particular embodiments, the guide vane 1701 has a radius of 0.25 m. The guide vane 1701 can have a thickness at a first end of 0.15 m. In particular embodiments, the guide vane 1701 is manufactured from high grade sheet metal or non-metallic composite material.

Figure 19:
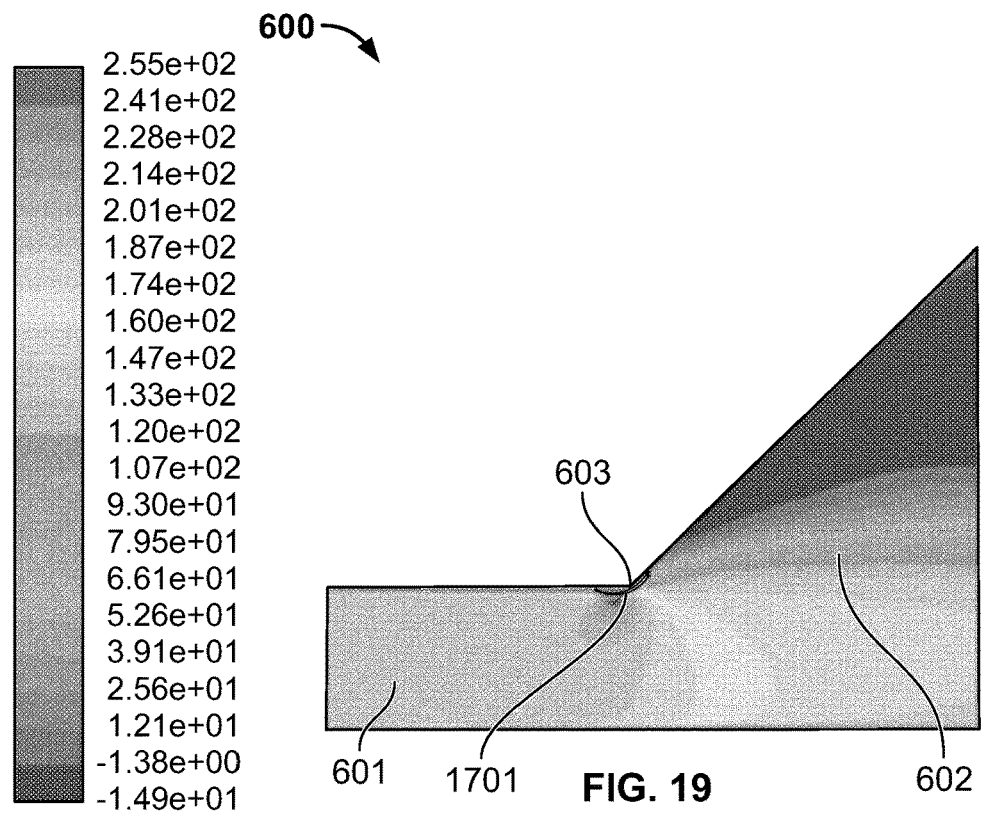
FIG. 19 illustrates the case 5a velocity contour for an inlet expansion duct with a guide vane 10 mm from the expansion angle, in accordance with particular embodiments.

FIG. 19 illustrates the case 5a velocity contour for the inlet expansion duct 600 with the guide vane 1701 positioned 10 mm from the expansion angle, in accordance with particular embodiments.

Figure 20:
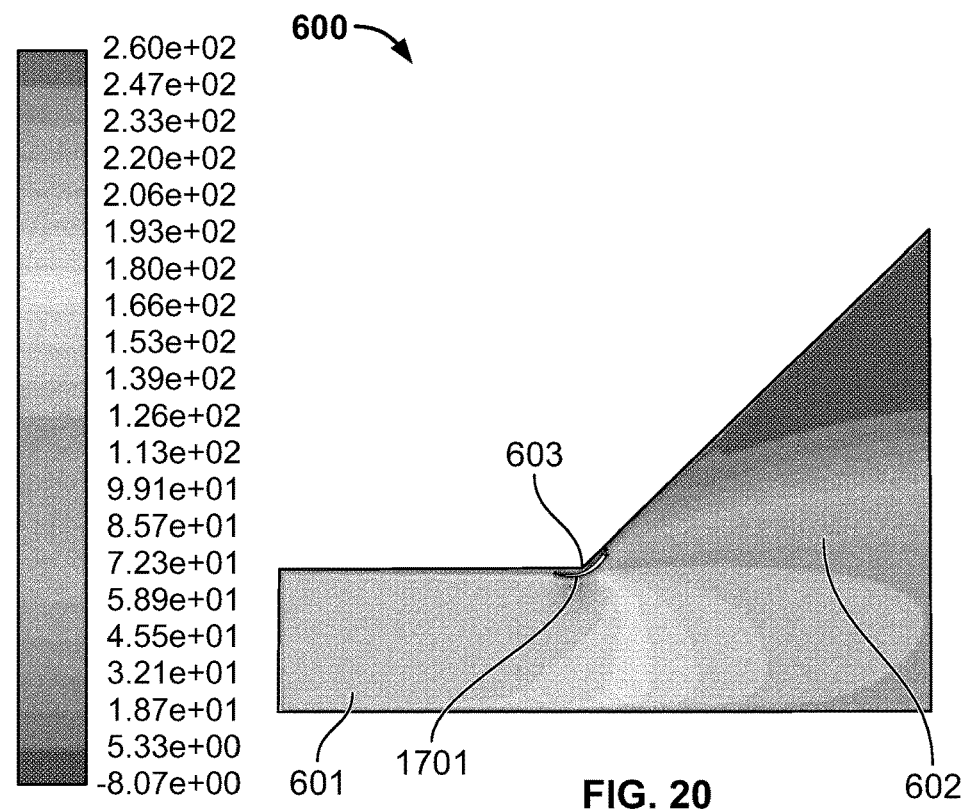
FIG. 20 illustrates the case 5b velocity contour for an inlet expansion duct with a guide vane 50 mm from the expansion angle, in accordance with particular embodiments.

FIG. 20 illustrates the case 5b velocity contour for the inlet expansion duct with the guide vane 1701 positioned 50 mm from the expansion angle, in accordance with particular embodiments.

Figure 21:
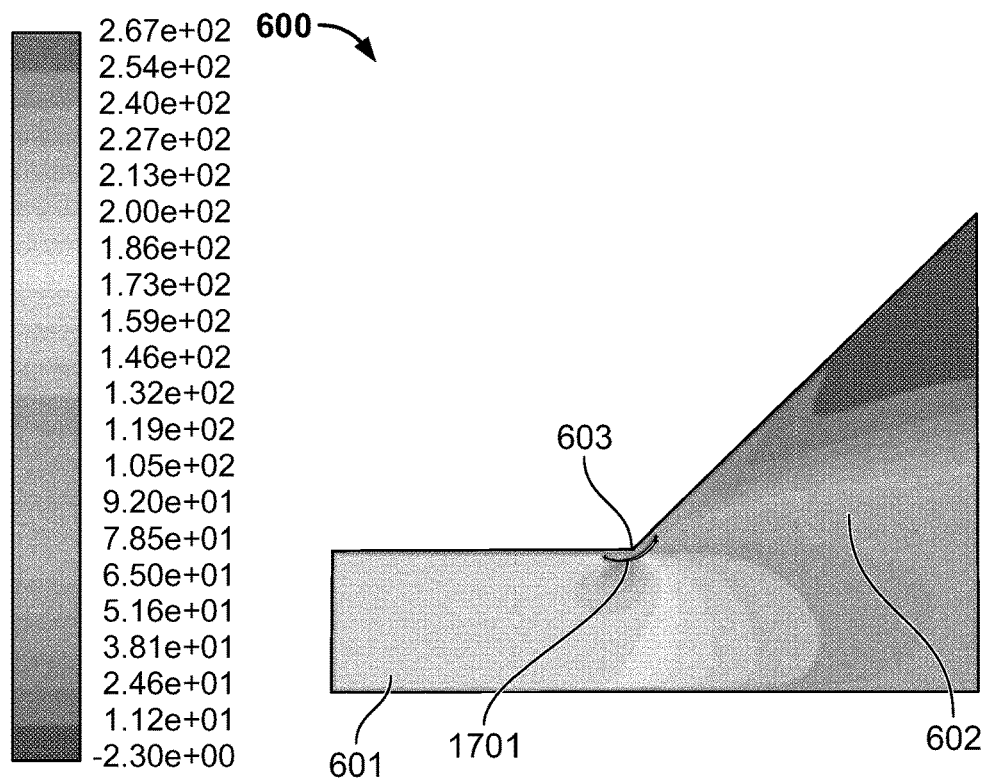
FIG. 21 illustrates the case 5c velocity contour for an inlet expansion duct with a guide vane 100 mm from the expansion angle, in accordance with particular embodiments.

FIG. 21 illustrates the case 5c velocity contour for the inlet expansion duct with the guide vane 1701 positioned 100 mm from the expansion angle, in accordance with particular embodiments.

Figure 22:
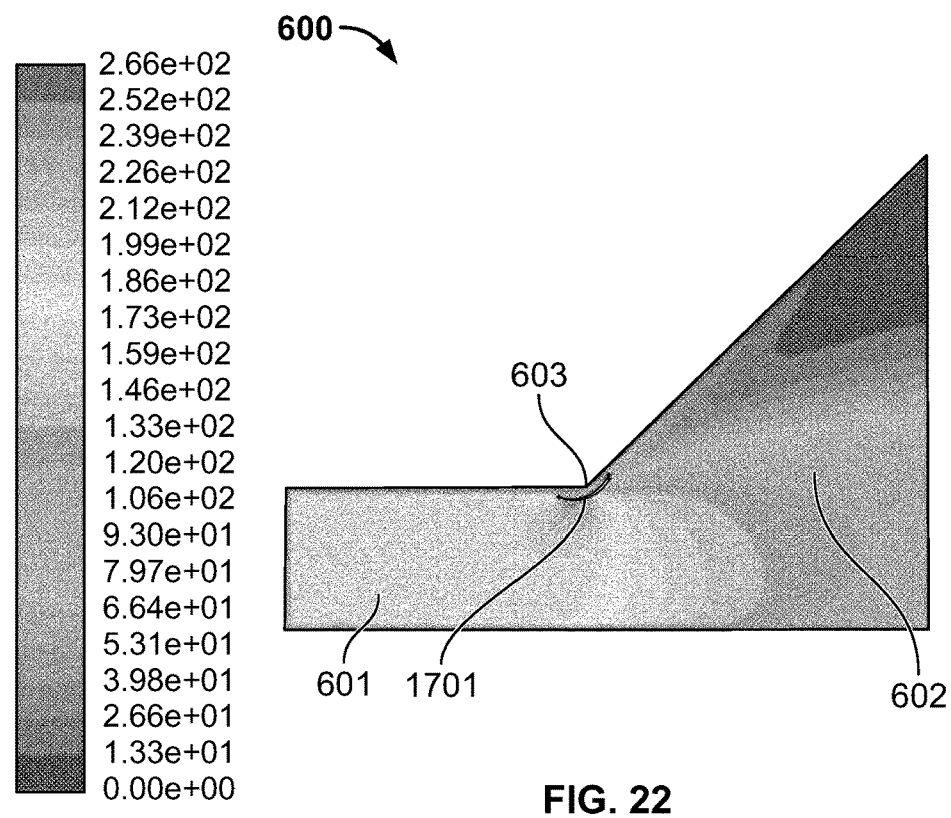
FIG. 22 illustrates the case 5d velocity contour for an inlet expansion duct with a guide vane 150 mm from the expansion angle, in accordance with particular embodiments.

FIG. 22 illustrates the case 5d velocity contour for the inlet expansion duct with the guide vane 1701 positioned 150 mm from the expansion angle, in accordance with particular embodiments.

Figure 23:
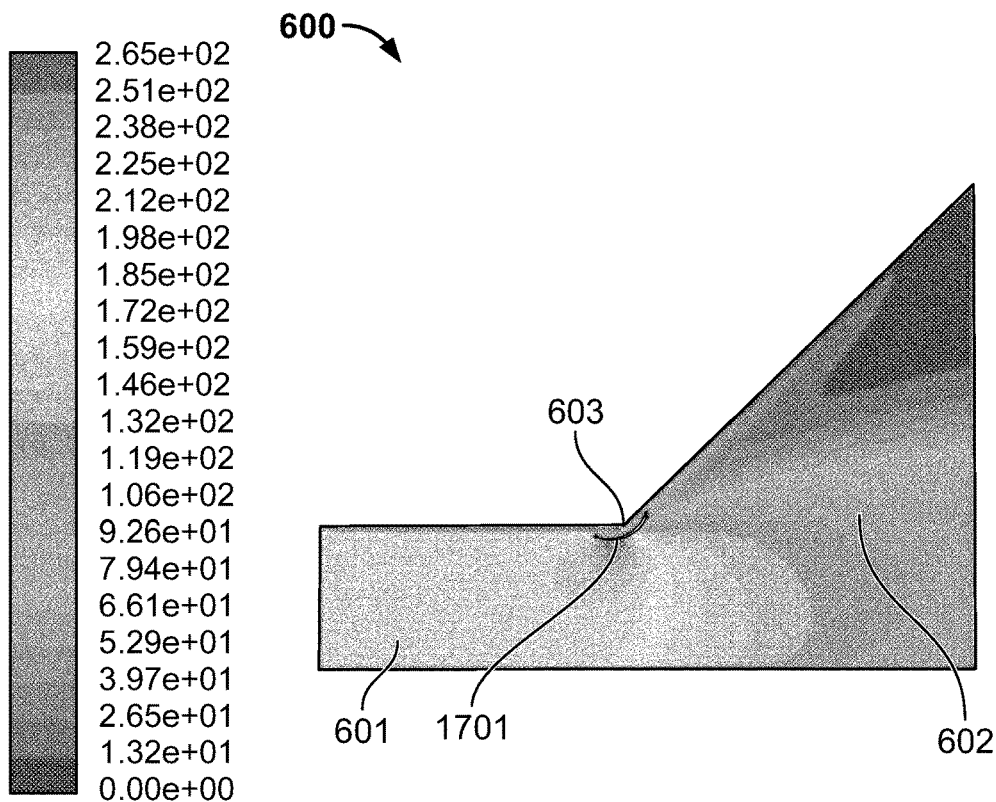
FIG. 23 illustrates the case 5e velocity contour for an inlet expansion duct with a guide vane 200 mm from the expansion angle, in accordance with particular embodiments.

FIG. 23 illustrates the case 5e velocity contour for the inlet expansion duct with the guide vane 1701 positioned 200 mm from the expansion angle, in accordance with particular embodiments.

FIG. 24 illustrates the case 5f velocity contour for the inlet expansion duct with the guide vane 1701 positioned 250 mm from the expansion angle, in accordance with particular embodiments.

Figure 25:
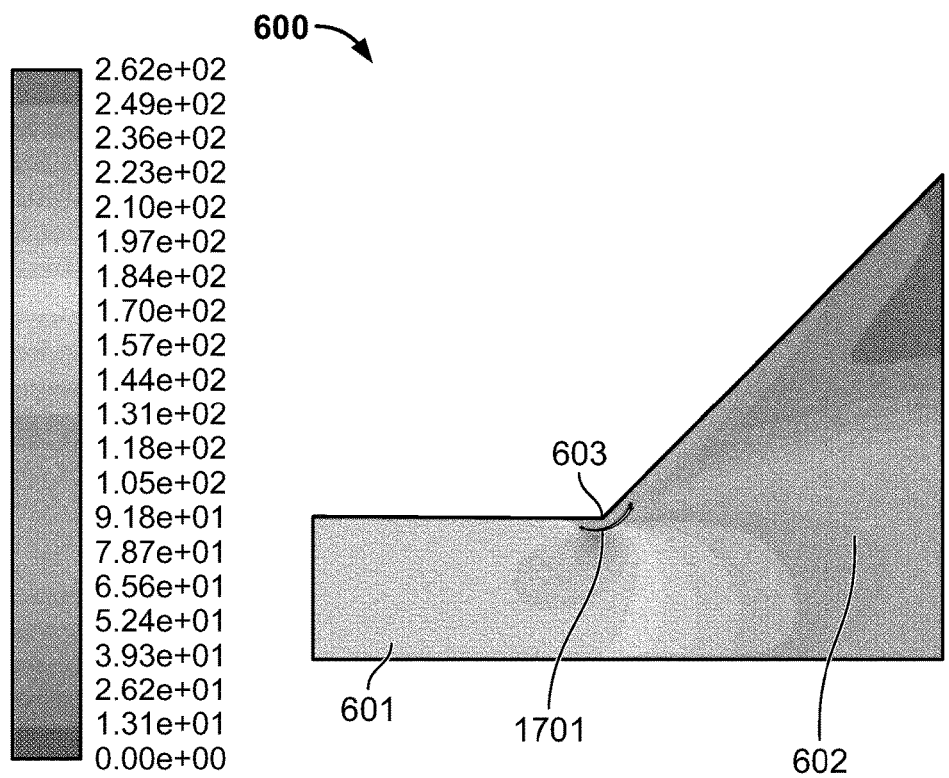
FIG. 25 illustrates the case 5g velocity contour for an inlet expansion duct with a guide vane 300 mm from the expansion angle, in accordance with particular embodiments.

FIG. 25 illustrates the case 5g velocity contour for the inlet expansion duct with the guide vane 1701 positioned 300 mm from the expansion angle, in accordance with particular embodiments.

Figure 26:
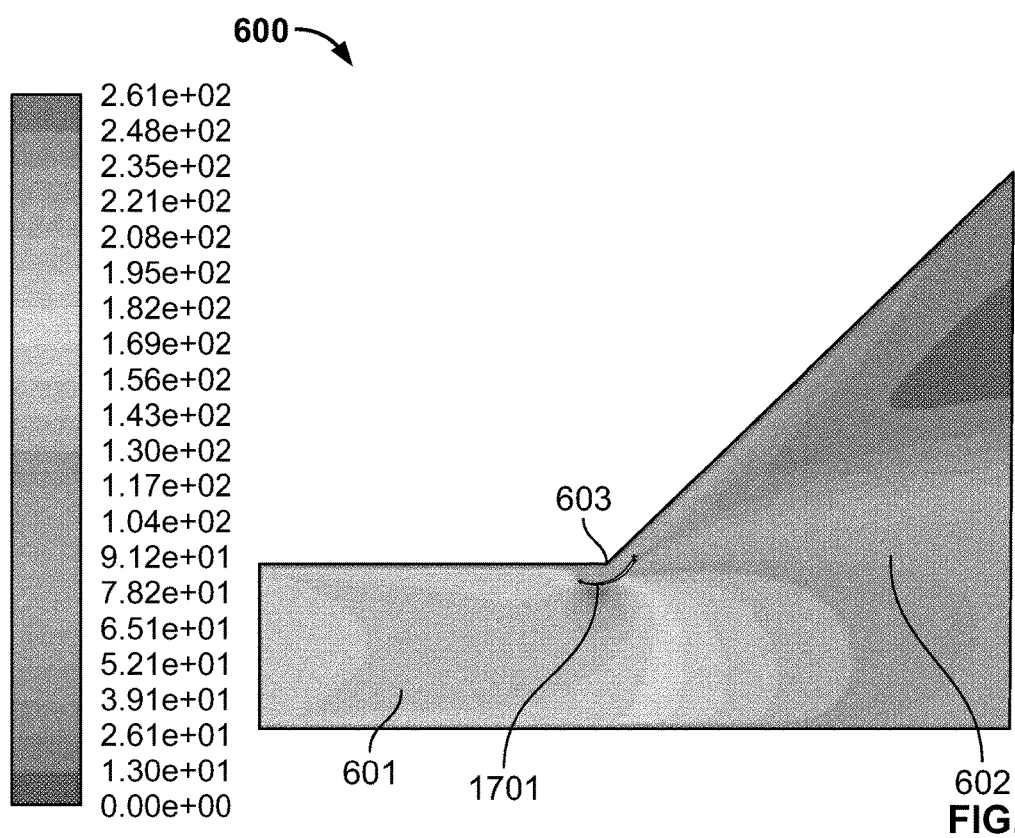
FIG. 26 illustrates the case 5h velocity contour for an inlet expansion duct with a guide vane 400 mm from the expansion angle, in accordance with particular embodiments.

FIG. 26 illustrates the case 5h velocity contour for the inlet expansion duct with the guide vane 1701 positioned 400 mm from the expansion angle, in accordance with particular embodiments.

Figure 27:
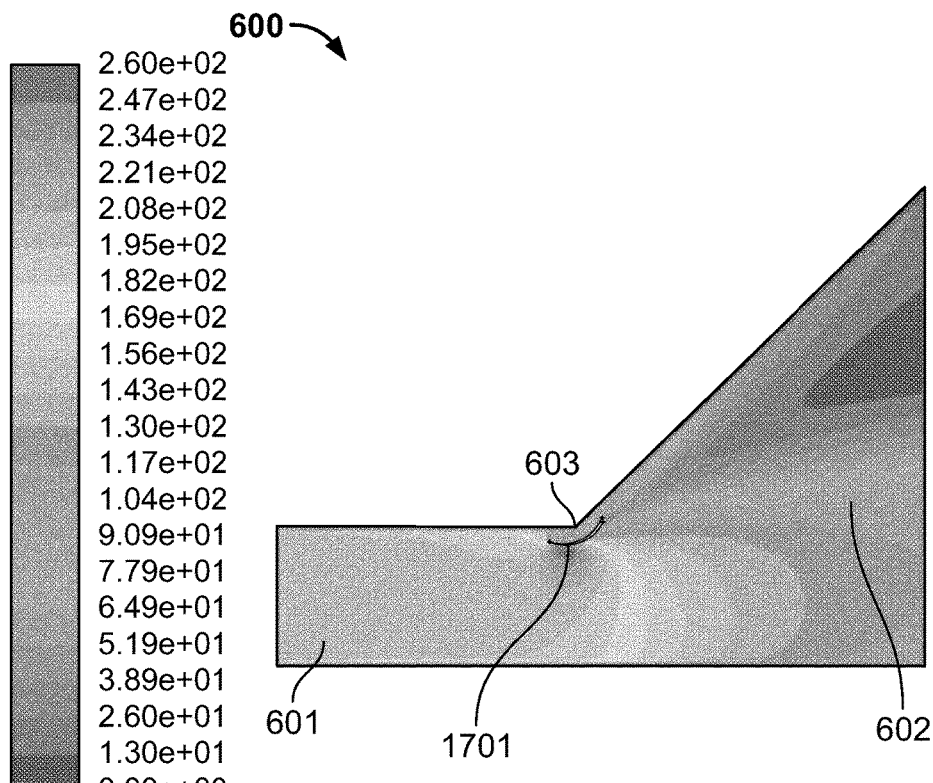
FIG. 27 illustrates the case 5i velocity contour for an inlet expansion duct with a guide vane 500 mm from the expansion angle, in accordance with particular embodiments.

FIG. 27 illustrates the case 5i velocity contour the inlet expansion duct with the guide vane 1701 positioned 500 mm from the expansion angle, in accordance with particular embodiments.

Figure 28:
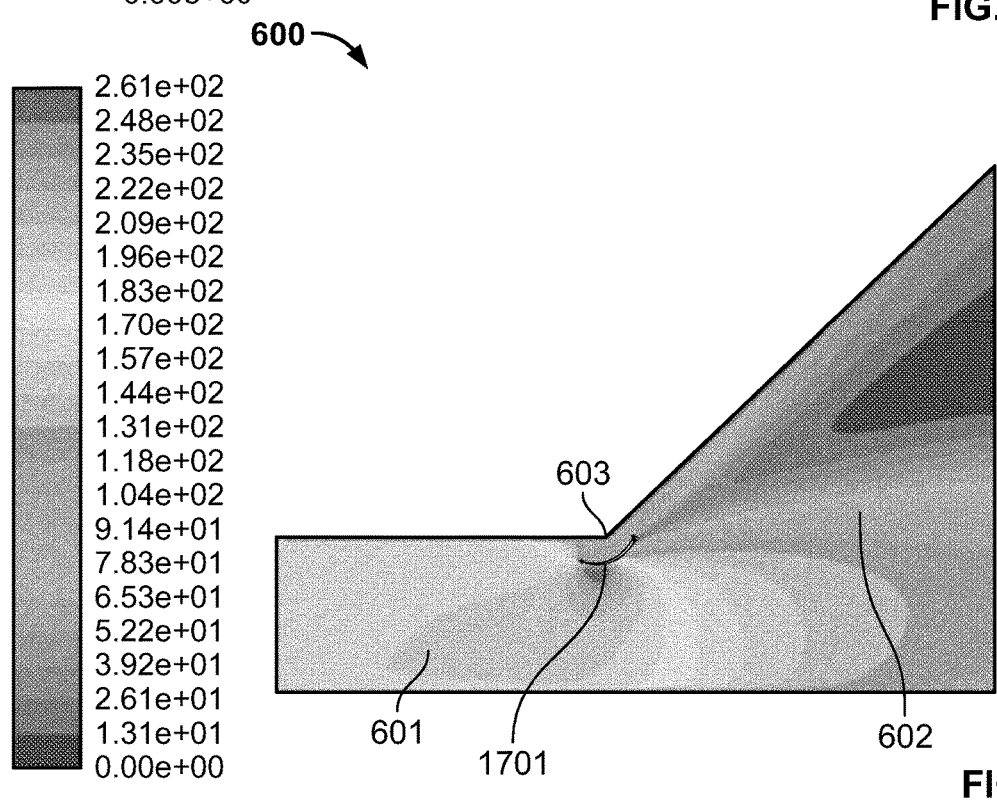
FIG. 28 illustrates the case 5j velocity contour for an inlet expansion duct with a guide vane 700 mm from the expansion angle, in accordance with particular embodiments.

FIG. 28 illustrates the case 5j velocity contour for the inlet expansion duct with the guide vane 1701 positioned 700 mm from the expansion angle, in accordance with particular embodiments.

FIG. 29 illustrates the case 5k velocity contour for the inlet expansion duct with the guide vane 1701 positioned 800 mm from the expansion angle, in accordance with particular embodiments.

FIG. 30 illustrates the case 5l velocity contour for the inlet expansion duct with the guide vane 1701 positioned 1000 mm from the expansion angle, in accordance with particular embodiments.

Figure 31:
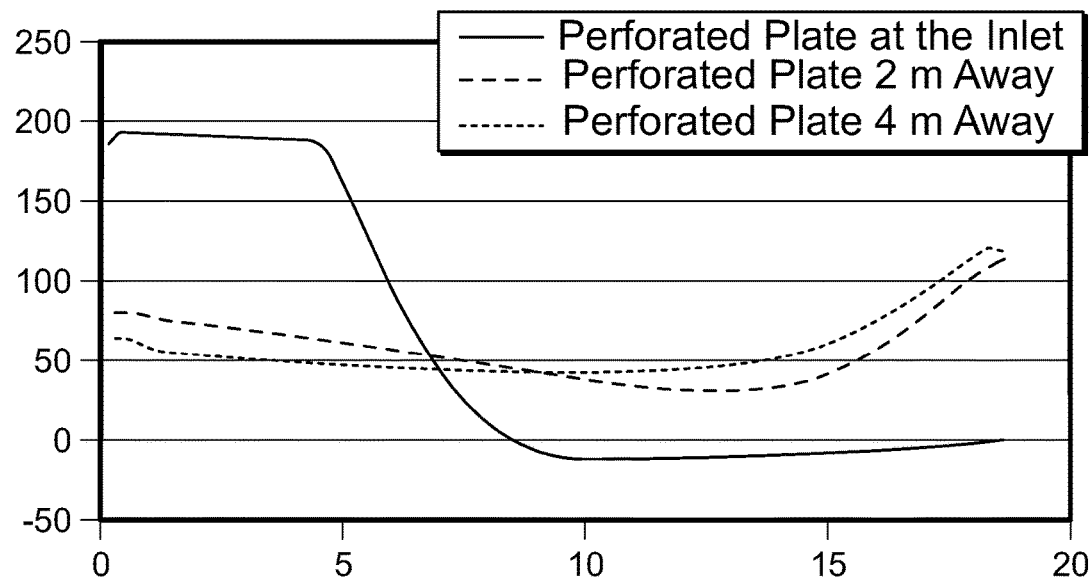
FIG. 31 illustrates a velocity profile at the duct's exit for different perforated plate positions for cases 2a, 2b and 2c, in accordance with particular embodiments.

FIG. 31 illustrates a velocity profile at the duct's exit for different perforated plate positions for cases 2a, 2b and 2c, in accordance with particular embodiments.

Discussion and Results Analysis

The wall function method was selected; therefore, the value of $y^+$ will be used as a validity measure for the solution accuracy. The solution will only be considered reliable only if $y^+$ is between 30 and 500, otherwise, the solution is rejected and mesh refinement should be applied to the model. Also, the RMS value at the duct's outlet should be at least within 30-40% as recommended by the most HRSG manufacturers.

The study described in the present disclosure was performed on a 2D model that does not produce the exact flow behaviour inside the HRSG inlet expansion duct. This is due to limited time and computing resources. However, the 2D model gives a general understanding for the flow and the effect of the flow distribution devices in homogenising the flow as required.

HRSG Inlet Expansion Duct without Flow Distribution Devices

Figure 10:
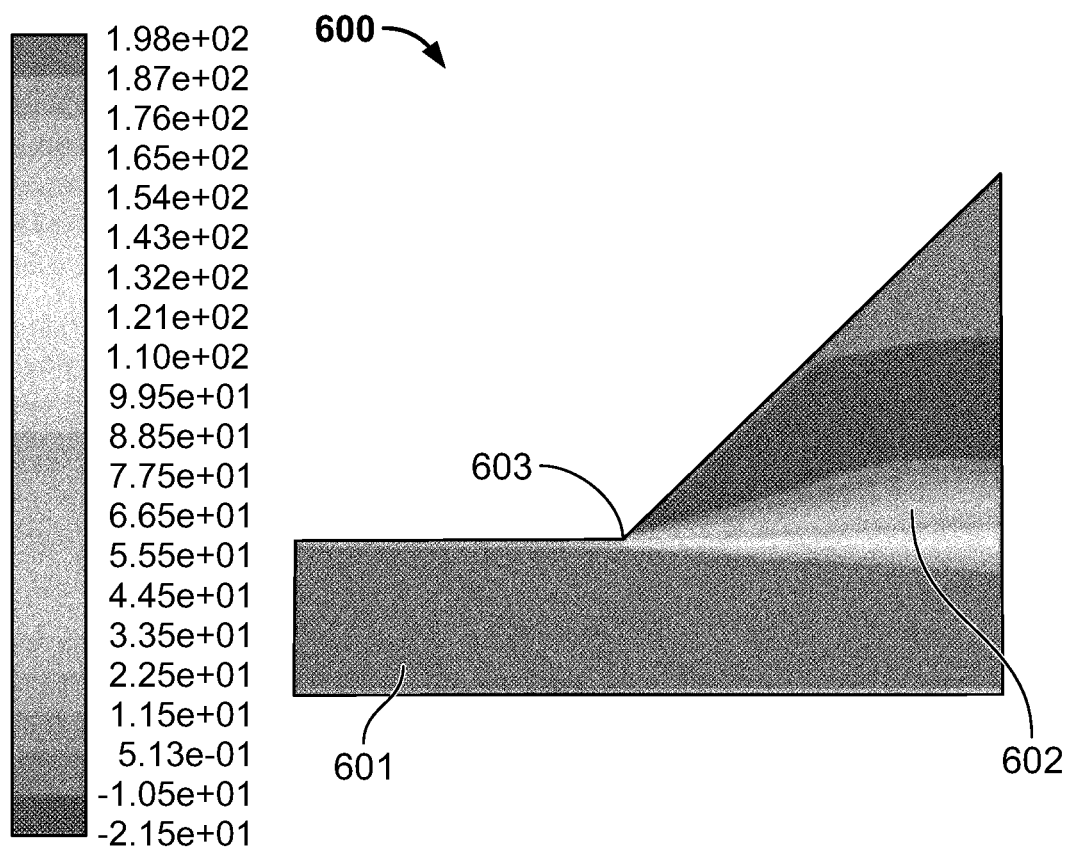
FIG. 10 reveals the velocity contour for the inlet expansion duct without any flow distribution devices.
Figure 11:
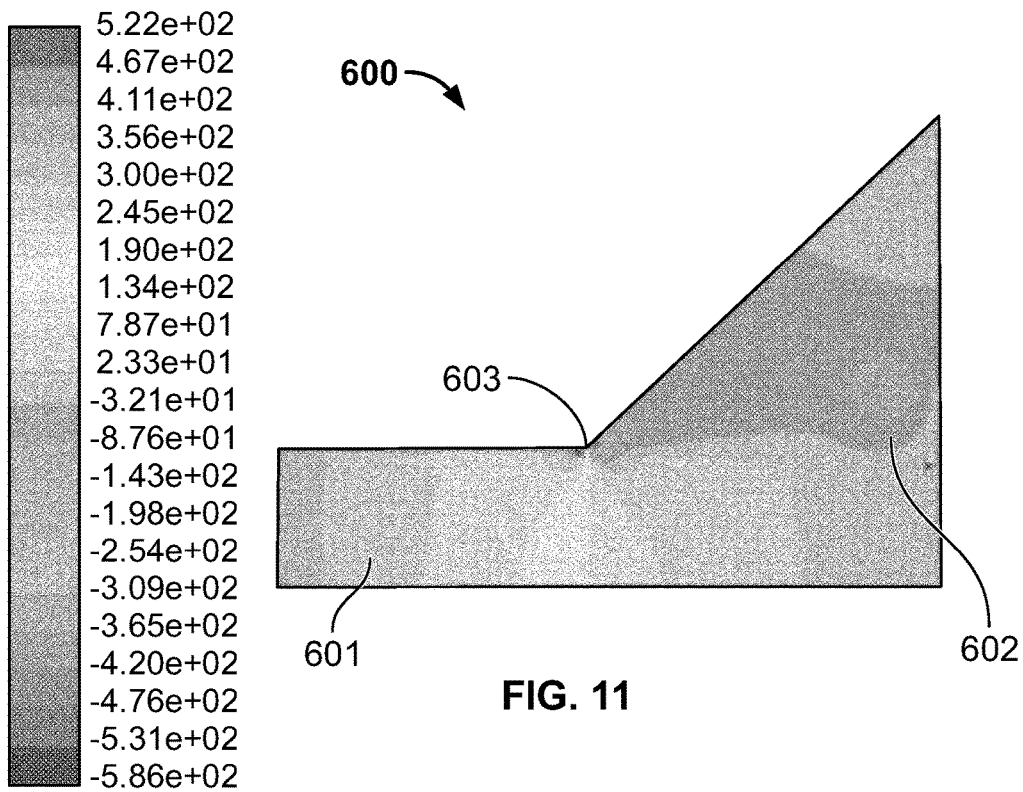
FIG. 11 shows a pressure contour for the inlet expansion duct without any flow distribution devices.

The flue gas flow in HRSG inlet expansion duct 600 is facing an adverse pressure gradient because of the sudden expansion as the duct 600 transitions from the duct inlet portion 601 to the duct expansion portion 602. As a result, flow recirculation is expected since the fluid close to the wall has very low kinetic energy that cannot resist this high pressure gradient. This recirculation region in the upper part of the duct expansion portion 602 tends to squeeze the flow in the lower part of the duct expansion portion 602. Therefore, the velocity profile is extremely not uniform at the exit of the expansion portion 602 of the inlet expansion duct 600, as shown in FIG. 10.

The non-uniformity of the flow might lead to lower efficiency of the HRSG, and might result in introducing hot spots in the super heaters tube banks. Also, the quality of the superheated steam might be reduced, impacting the performance of the steam turbine. Therefore, flow distribution devices can be used to minimize those possible side effects.

Flow Behaviour after Installing Perforated Plate

One flow distribution device, perforated plate 1201, was simulated as porous media, which adds an inertial loss. The porous media depends on the numbers of the holes and the thickness of the perforated plate 1201. The porous media provides a simulation of the perforated plate 1201 in Fluent and it provides a faster solution convergence. The best flow pattern at the outlet of inlet expansion duct 600 was found when the perforated plate 1201 is installed at 2 m and 4 m from the expansion angle 603 as shown in FIG. 13 and FIG. 14 respectively. The separation region was contracted significantly compared to case 1 without any flow distribution devices. On the other hand, installing the perforated plate 1201 at the inlet of the duct expansion portion 601 did not add any benefit to homogenise the flow.

The velocity profile at the outlet of the duct for each position of perforated plate is shown in FIG. 31. Although, the reverse flow has been eliminated with the perforated plate 1201 installed at 2 m in case 2b, the pressure drop is still high compared to the case 2c. The pressure drop is listed in Table 3 and shows a decrease by almost half in case 2c compared to case 2b. On the other hand, the reattachment length for the flow before the perforated plate 1201 in case 2b is shorter than case 2c. Also, the separation region for case 2c is bigger that case 2b.

TABLE 3

Pressure drop for different perforated plate position

| Case Details | Pressure Drop (Pa) |
| --- | --- |
| Case 2a: Perforated plate 1201 installed at the inlet of the expansion | 4945.73 |
| Case 2b: Perforated plate 1201 installed 2 m from inlet of the expansion | 3691.85 |
| Case 2c: Perforated plate 1201 installed 4 m from inlet of the expansion | 1893.84 |

Flow Behaviour after Installing Flow Diverter

Figure 32:
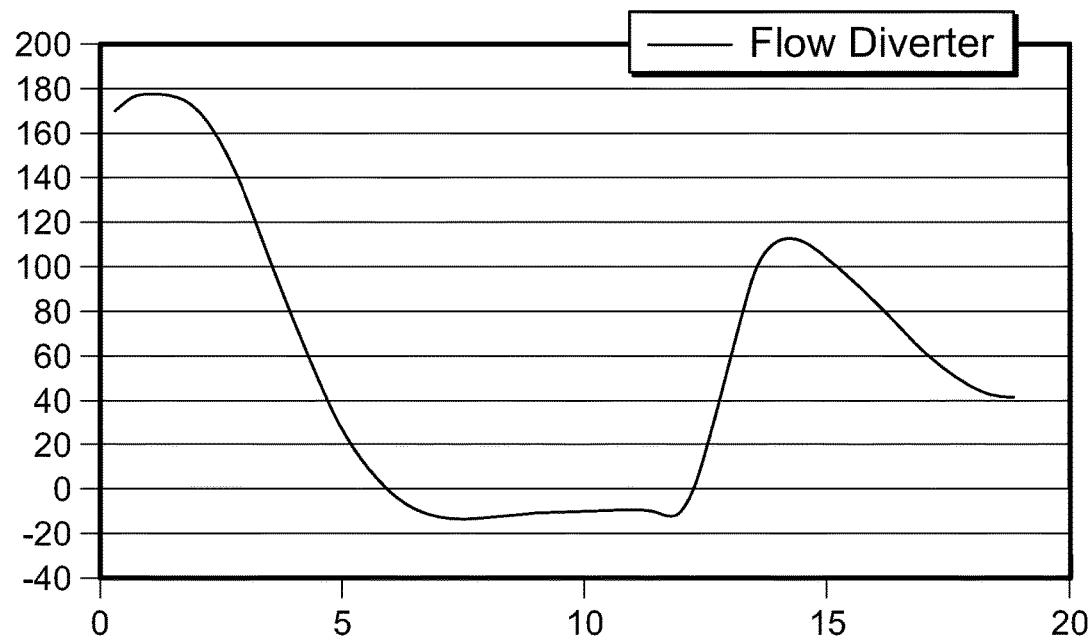
FIG. 32 shows a velocity profile at the duct's exit for case 3

The flow pattern at the outlet of the inlet expansion duct 600 shows little enhancement after installing the flow diverter 1501 in duct 600 since the reverse flow was minimized. However, the wake behind the flow diverter 1501 separated the flow to the upper and lower part of the duct expansion portion 602 creating two re-circulating regions. FIG. 32 shows the flow pattern after installing a flow diverter 1501 that was illustrated in FIG. 15, upstream from the super heaters tube banks. Although the pressure drop is very low compared to other cases as shown in Table 4, the implantation of such a flow diverter requires a huge modification and additional material to support this type of flow diverter. The additional supports may worsen the flow behaviour and increase the pressure drop value. The weight of a flow diverter of this type is huge and the support should be strong enough to carry the weight and overcome the flue gas mass flow rate. Therefore, it is important to include those factors before proceeding with selecting this flow diverter as flow distribution devices for the HRSG.

Flow Behaviour after Installing Baffle Plates

Figure 33:
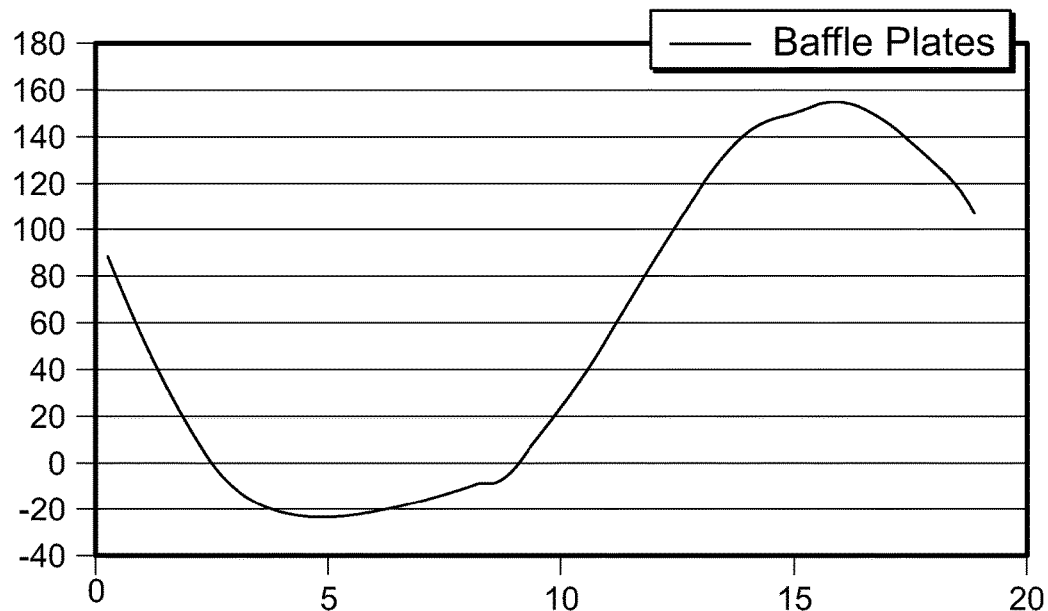
FIG. 33 shows a velocity profile at the duct's exit for case 4

The simulated baffle plates 1601a-1601e shown in FIG. 16 for case 4, showed good performance in directing the flow with the same angle of plates installation. However, the wake downstream from the last plate generated a flow recirculation and unwanted reverse flow. The result of the flow analysis using the baffle plates in FIG. 33 shows a reverse flow close to the middle area of the duct's exit with a pressure drop of 150.3 Pa.

Flow Behaviour after Installing the Proposed Guide Vane

One impact of embodiments of the present disclosure is to produce homogenised flow at the outlet of the inlet expansion duct with the minimum pressure drop as well as the least cost of implementation. In addition, embodiments of the present disclosure help minimize the additional modification to the structure for any existing HRSG. Therefore, introducing the guide vane 1701 at the inlet of the duct expansion portion 602 reduced the pressure gradient on the flow by reducing the sudden expansion effect. This reduces and/or eliminate the possibility of flow separation and the flow will be homogenised accordingly.

Figure 34:
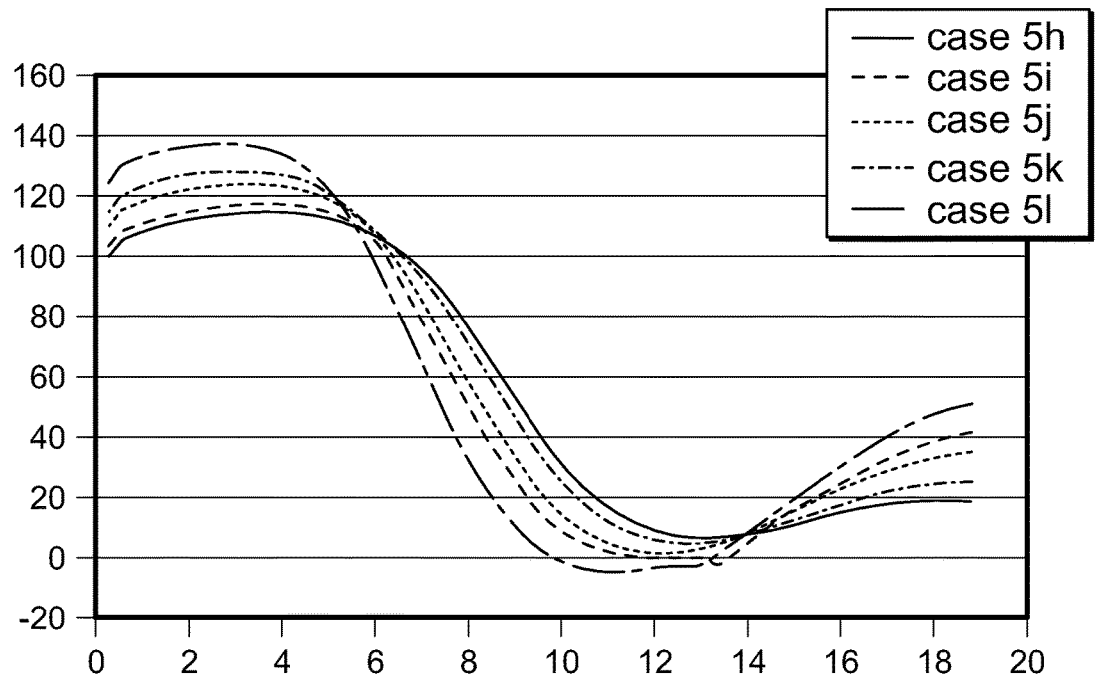
FIG. 34 shows a velocity profile at the duct's exit for cases 5h, 5i, 5j, 5k and 5l

The velocity profile at the outlet of inlet expansion duct 600 continues to enhance as the guide vane 1701 is moved away from the wall. This is for a certain distance and then further movement will destroy the flow pattern and negative axial velocity will arise. FIG. 34 shows a velocity profile at the exit of duct 600 for cases 5h, 5i, 5j, 5k and 5l. The pressure drop continued to reduce until this point is reached as presented in Table 4 for case 5a to case 5l.

TABLE 4 pressure drop and velocity profile for
different any flow distribution devices

|  | Mean velocity at the exit (m/s) | RMS (%) | Pressure Drop (Pa) |
|---|---|---|---|
| Case 2a | 55.770 | 85.521 | 4945.732 |
| Case 2b | 54.645 | 22.948 | 3691.851 |
| Case 2c | 54.794 | 22.719 | 1893.848 |
| Case 3 | 54.537 | 63.705 | 52.474 |
| Case 4 | 54.543 | 66.757 | 150.3 |
| Case 5a | 55.173 | 65.826 | 132.852 |
| Case 5b | 55.340 | 56.805 | 121.304 |
| Case 5c | 55.865 | 49.920 | 168.770 |
| Case 5d | 55.873 | 47.540 | 171.407 |
| Case 5e | 55.844 | 46.938 | 171.407 |
| Case 5f | 55.843 | 45.344 | 174.044 |
| Case 5g | 55.810 | 45.241 | 171.407 |
| Case 5h | 55.754 | 45.339 | 168.770 |
| Case 5i | 55.697 | 46.150 | 164.287 |
| Case 5j | 55.597 | 48.345 | 152.948 |
| Case 5k | 55.498 | 50.498 | 131.8517 |
| Case 5l | 55.397 | 54.170 | 147.6739 |

CONCLUSION

The effect of flow distribution devices on the flue gas velocity profile at the outlet of the inlet expansion duct 600 has been analysed and described herein. The present disclosure demonstrate how embodiments disclosed herein homogenise the flue gas flow as much as possible with minimum pressure drop in the HRSG before the flow impinges to the super heater tubes bank. The analysis described herein was done on an unfired inlet expansion duct 600 for a heat recovery steam generator. The selected flow distribution devices were based on the minimum pressure drop in the HRSG as well as maximum homogenous flow before it impinges on the super heater tubes bank. The numerical simulation was done using K-ε turbulence model with the standard wall function used by Fluent. Their analysis described herein was performed using 2D model due to limitation of time and computational resources. Also, the back pressure effect from the main stack was not considered as part of the simulation as its effect is negligibly small.

The design of the inlet expansion duct 600 design does not help in homogenising the flue gas flow; therefore, additional resistance is required to produce a uniform flow pattern. Although flow distribution devices introduce resistance that increases the pressure drop, it can be reduced to minimum value by changing the type to homogenise the flow. The results shows that RMS value at the outlet of the inlet expansion duct 600 for the perforated plate 1201 is about 22.7%; however, the pressure drop in the HRSG was found in the range between 3691.851 Pa and 1893.848 Pa. On the other hand, RMS value for the proposed guide vane 1701 is approximately 45%, but the pressure drop can be reduced to 131.9 Pa.

There is no one single set up that can be implemented for different HRSG ducts and that will provide homogenised flow at the duct's exit. For instance, each case with its own boundary conditions may have a different flow distribution device configuration that works perfectly for that specific case. The results described in the present disclosure provide a basis that can be used for the HRSG inlet expansion duct design and selection of the flow distribution device configured to achieve the best performance of the steam generation.

Other Embodiments

The several options and embodiments described herein can be combined to provide further embodiments. For example, there can also be another function of HRSG, which is to remove NOx from the gas exhaust. The flue gas passes through flow distribution devices to be homogenized in order to uniformly pass through selective catalyst reduction (SCR), which is responsible to reduce NOX concentration to 10 ppm. This can be done in accordance with example embodiments through generating a uniform flow and maintaining the temperature range between 500° C. and 600° C. Therefore, selective catalytic reduction is normally placed downstream from economizers.

NOMENCLATURE

CFD Computational Fluid Dynamics
DNS Direct Numerical Simulation
E Wall Roughness Value
FCD Flow Correction Devices
FEM Finite Element Method
$f_u$ Damping Function
HRSG Heat Recovery Steam Generators
k Turbulence Kinetic Energy
Characteristic Length Scale
L Integral Length Scale
LES Large Eddy Simulation
LEV Linear Eddy Viscosity
$l_m$ Mixing Length
LRN Low Reynolds Number
NLEV Non Linear Eddy Viscosity
$NO_x$ Nitrogen Oxides
$P_k$ Production Term
RANS Reynolds Averaged Navier Stokes
Re Reynolds Number
RMS Root Mean Square
RNG Re-Normalisation Group
RSM Reynolds Stress Model
SCR Selective Catalytic Reduction
$s_{ij}$ Strain Rate
SIMPLE Semi-Implicit Method for Pressure Linked Equations
$U^+$ Dimensionless Velocity
$u_i$ Reynolds Stresses
$U_p$ Bulk Velocity at the Node
WF Wall Function
$y^+$ Dimensionless Distance to the Wall
$y_p$ First Node Distance from the Wall
$C_D$ Constant
$C_{\epsilon 1}$ Constant
$C_{\epsilon 2}$ Constant
$\delta_{ij}$ Kronekar Delta
ε Dissipation Term
η Kolmogorov length scale
ν Kinematic Viscosity $v_T$ Turbulent Viscosity
ρ Density
$\tau_{ij}$ Reynolds stress tensor
$\tau_w$ Wall Shear Stress
ω Specific Dissipation Term
$\sigma_k$ Constant
$\sigma_{ij}$ Constant

What is claimed is:
1. A flow distribution device, comprising:
a duct including an expansion portion coupled to a heat recovery steam generator and extending from an inlet portion coupled to a turbine exhaust, the expansion portion having a larger cross-sectional area than the inlet portion;

a single guide vane having a curved surface, the guide vane positioned in the duct to extend from at least a part of the inlet portion into the expansion portion, wherein the guide vane extends laterally across the duct from a first sidewall of the duct to a second sidewall of the duct, and the guide vane is radially positioned about an interface location of the inlet portion and the expansion portion, the guide vane comprising a thickness that varies from a first thickness at a flow inlet edge of the guide vane to a second thickness at a flow outlet edge of the guide vane that is greater than the first thickness, and the guide vane is defined by parameters comprising a length of 2 meters long, a radius of curvature of 0.25 meters, and the first thickness at the flow inlet edge of the guide vane of 0.15 meters, the parameters configured to produce a homogenized flow at an outlet of the expansion portion of the duct.

2. The flow distribution device of claim 1, wherein the guide vane is positioned adjacent to a sidewall of the duct.

3. The flow distribution device of claim 1, wherein the duct includes a rectangular cross section.

4. The flow distribution device of claim 1, wherein the duct is formed from sections having straight side walls.

5. The flow distribution device of claim 1, wherein a side wall of the duct forms a point at a transition in the interface between the expansion region and the inlet region.

6. The flow distribution device of claim 5, wherein the guide vane extends around the point.

7. The flow distribution device of claim 5, wherein the guide vane is positioned adjacent to the point.

8. The flow distribution device of claim 5, wherein the guide vane is positioned in the range of 10 mm to 1000 mm from the point.

9. The flow distribution device of claim 5, wherein the guide vane is positioned at least one of 10 mm, 50 mm, 100 mm, 150 mm, 200 mm, 250 mm, 300 mm, 400 mm, 500 mm, 700 mm, 800 mm, and 1000 mm from the point.

10. The flow distribution device of claim 1, wherein the guide vane is composed of metal.

11. The flow distribution device of claim 10, wherein the guide vane is composed of sheet metal.

12. The flow distribution device of claim 1, wherein the guide vane is composed of a nonmetallic composite material.

13. The flow distribution device of claim 1, wherein the inlet region is coupled to a turbine exhaust.

14. The flow distribution device of claim 1, wherein the expansion region is coupled to a heat recovery steam generator.

15. The flow distribution device of claim 14, wherein the expansion portion is fluidly coupled to a super heater of the steam generator, the superheater including a bank of tubes.

16. The flow distribution device of claim 1, wherein the guide vane is perforated.

17. The flow distribution device of claim 1, wherein the guide vane includes a plurality of perforations having a plurality of different sizes.

* * * * *